US012652528B2

(12) United States Patent
Choi et al.

(10) Patent No.: US 12,652,528 B2
(45) Date of Patent: Jun. 9, 2026

(54) METHOD AND DEVICE FOR PROVISION KEY FOR BASE STATION VERIFICATION IN WIRELESS COMMUNICATION SYSTEM

(71) Applicant: Samsung Electronics Co., Ltd., Gyeonggi-do (KR)

(72) Inventors: Hongjin Choi, Gyeonggi-do (KR); Duckey Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 250 days.

(21) Appl. No.: 18/361,187

(22) Filed: Jul. 28, 2023

(65) Prior Publication Data

US 2024/0040377 A1 Feb. 1, 2024

(30) Foreign Application Priority Data

Jul. 28, 2022 (KR) ........................ 10-2022-0094142
Nov. 11, 2022 (KR) ........................ 10-2022-0150789

(51) Int. Cl.

| | |
|---|---|
| *H04W 12/06* | (2021.01) |
| *H04L 9/14* | (2006.01) |
| *H04L 9/30* | (2006.01) |
| *H04W 12/0431* | (2021.01) |
| *H04W 12/08* | (2021.01) |
| *H04W 12/106* | (2021.01) |

(Continued)

(52) U.S. Cl.
CPC ........... *H04W 12/0431* (2021.01); *H04L 9/14* (2013.01); *H04L 9/30* (2013.01); *H04W 12/106* (2021.01); *H04W 48/08* (2013.01); *H04W 76/10* (2018.02)

(58) Field of Classification Search
CPC ............. H04W 76/10; H04W 12/0431; H04W 12/106; H04W 12/108; H04W 12/122; H04W 48/08; H04L 9/14; H04L 9/30; H04L 9/3247; H04L 9/3263; H04L 2209/80
USPC ....................................................... 455/411
See application file for complete search history.

(56) References Cited

U.S. PATENT DOCUMENTS

| | | | | |
|---|---|---|---|---|
| 2015/0004925 A1* | 1/2015 | Suh | ........................ | H04W 12/10 |
| | | | | 455/404.1 |
| 2017/0295489 A1* | 10/2017 | Agiwal | ............. | H04W 12/0433 |

(Continued)

FOREIGN PATENT DOCUMENTS

WO WO 2020/251442 12/2020

OTHER PUBLICATIONS

IP.com search History (Year: 2025).*

(Continued)

*Primary Examiner* — Moustapha Diaby
(74) *Attorney, Agent, or Firm* — The Farrell Law Firm, P.C.

(57) ABSTRACT

The disclosure relates to a 5G or 6G communication system for supporting a higher data transmission rate. Methods and devices in a wireless communication system are provided. System information is received from a base station. The system information includes information related to a public key of a base station. It is determined whether the public key corresponding to the information related to the public key is stored in the terminal. In case that the public key is stored in the terminal and the system information includes signature information of the base station, a signature of the base station is verified. The base station is connected to or another base station is searched for, based on whether the signature of the base station is verified.

20 Claims, 10 Drawing Sheets

(51) Int. Cl.
  *H04W 12/12*      (2021.01)
  *H04W 48/08*      (2009.01)
  *H04W 76/10*      (2018.01)
  *H04W 88/02*      (2009.01)

(56)                References Cited

U.S. PATENT DOCUMENTS

| | | | | |
|---|---|---|---|---|
| 2019/0082325 | A1* | 3/2019 | Muhanna | H04W 12/04 |
| 2020/0145821 | A1* | 5/2020 | Lee | H04W 48/12 |
| 2020/0344611 | A1 | 10/2020 | Lee et al. | |
| 2021/0111902 | A1* | 4/2021 | Lee | H04W 12/069 |
| 2021/0204129 | A1* | 7/2021 | Yang | H04W 12/73 |
| 2021/0409942 | A1 | 12/2021 | De Kievit et al. | |
| 2022/0038897 | A1* | 2/2022 | Liu | H04W 12/02 |
| 2022/0086636 | A1 | 3/2022 | Trakinat et al. | |
| 2022/0232384 | A1* | 7/2022 | Muhanna | H04W 12/06 |
| 2022/0256337 | A1 | 8/2022 | Ohlsson et al. | |

OTHER PUBLICATIONS

3GPP TR 33.809 V0.19.0, 3rd Generation Partnership Project; Technical Specification Group Services and System Aspects Study on 5G Security Enhancement Against False Base Stations (FBS) (Release 18), May 2022, 126 pages.
International Search Report dated Nov. 14, 2023 issued in counterpart application No. PCT/KR2023/011076, 9 pages.
Apple, "PCR: Evaluation for Solution#14", S3-193500, 3GPP TSG-SA WG3 Meeting #96adhoc, Oct. 14-18, 2019, 2 pages.
Samsung, "Resolving EN of Solution#7 (TR 33.809)", S3-223734, 3GPP TSG-SA3 Meeting #109, Nov. 14-18, 2022, 3 pages.
Samsung, "Updates to Solution#7 SI Verification using Digital Signatures", S3-223733, 3GPP TSG-SA3 Meeting #109, Nov. 14-18, 2022, 4 pages.
European Search Search Report dated Jul. 29, 2025 issued in counterpart application No. 23847047.0-1218, 13 pages.
European Search Search Report dated Oct. 21, 2025 issued in counterpart application No. 23847047.0-1218, 11 pages.

* cited by examiner

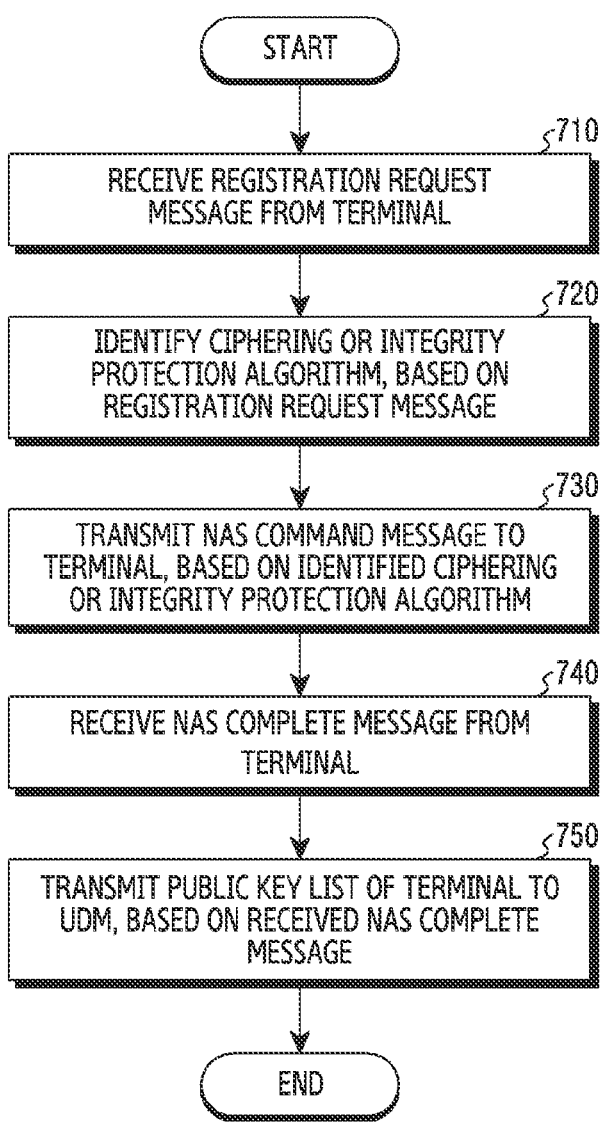

START

710
RECEIVE REGISTRATION REQUEST MESSAGE FROM TERMINAL

720
IDENTIFY CIPHERING OR INTEGRITY PROTECTION ALGORITHM, BASED ON REGISTRATION REQUEST MESSAGE

730
TRANSMIT NAS COMMAND MESSAGE TO TERMINAL, BASED ON IDENTIFIED CIPHERING OR INTEGRITY PROTECTION ALGORITHM

740
RECEIVE NAS COMPLETE MESSAGE FROM TERMINAL

750
TRANSMIT PUBLIC KEY LIST OF TERMINAL TO UDM, BASED ON RECEIVED NAS COMPLETE MESSAGE

END

FIG.7

METHOD AND DEVICE FOR PROVISION KEY FOR BASE STATION VERIFICATION IN WIRELESS COMMUNICATION SYSTEM

CROSS REFERENCE TO RELATED APPLICATION

This application is based on and claims priority to Korean Application Nos 10-2022-0094142 and 10-2022-0150789, filed in the Korean Intellectual Property Office on Jul. 28, 2022, and Nov. 11, 2022, respectively, the contents of which are incorporated herein by reference.

BACKGROUND

1. Field

The disclosure relates generally to a method and a device for provisioning a key for base station verification in a wireless communication system, and more particularly, to a method and a device by which a base station signs and broadcasts system information in a wireless communication system, and a terminal provisioned with a key for verifying the same.

2. Description of Related Art mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple input-multiple output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio-unlicensed (NR-U) aimed at system operations conforming to various regulation-related requirements in unlicensed bands, NR UE Power Saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

As described above, according to the development of wireless communication systems, open-source tools and hacking techniques enabling easy manufacture of false base stations and mobile communication terminals have also appeared. Through the development of such techniques, it has become easier for an aggressor to perform a denial-of-service (DoS) attack against a user and a communication service provider by using a false base station. Therefore, a method for preventing a DoS attack from a false base station is required.

SUMMARY

An aspect of the disclosure provides a device and a method for providing smooth efficiency for transmission or reception of a signal for base station verification in a wireless communication system.

According to an embodiment, a method performed by a terminal in a wireless communication system is provided. The method includes receiving system information from a base station. The system information includes information related to a public key of a base station. It is determined whether the public key corresponding to the information related to the public key is stored in the terminal. In case that the public key is stored in the terminal and the system information includes signature information of the base station, a signature of the base station is verified. The base station is connected to or another base station is searched for, based on whether the signature of the base station is verified.

According to an embodiment, a method performed by an access and mobility management function (AMF) in a wireless communication system is provided. A registration request message is received from a terminal and includes information relating to a first list of public keys held by the terminal or an indicator indicating that a public key of a base station is not stored at the terminal. A ciphering and integrity protection algorithm is identified, based on the registration request message. A non-access stratum (NAS) command message is transmitted to the terminal, based on the registration request message and the identified ciphering and integrity algorithm.

According to an embodiment, a terminal in a wireless communication system may include at least one transceiver, and at least one processor functionally coupled to the at least one transceiver. The at least one processor is configured to receive system information from a base station. The system information includes information related to a public key of a base station. It is determined whether the public key corresponding to the information related to the public key is stored in the terminal. In case that the public key is stored in the terminal and the system information includes signature information of the base station, a signature of the base station is verified. The base station is connected to or another base station is searched for, based on whether the signature of the base station is verified.

According to an embodiment, an AMF in a wireless communication system may include at least one transceiver, and at least one processor functionally coupled to the at least one transceiver. The at least one processor is configured to receive, from a terminal, a registration request message including information relating to a first list of public keys held by the terminal or an indicator indicating that a public key of a base station is not stored at the terminal, identify a ciphering and integrity protection algorithm, based on the registration request message, and transmit a NAS command message to the terminal, based on the registration request message and the identified ciphering and integrity algorithm.

Various embodiments of the disclosure may provide a device and a method for effectively providing a service in a wireless communication system.

BRIEF DESCRIPTION OF THE DRAWINGS

The above and other aspects, features, and advantages of the disclosure will be more apparent from the following detailed description when taken in conjunction with the accompanying drawings, in which:

FIG. 7 is a diagram illustrating an operational flow of an AMF to provision a terminal with a public key for verifying a base station, according to an embodiment.

DETAILED DESCRIPTION

Figure 1A:
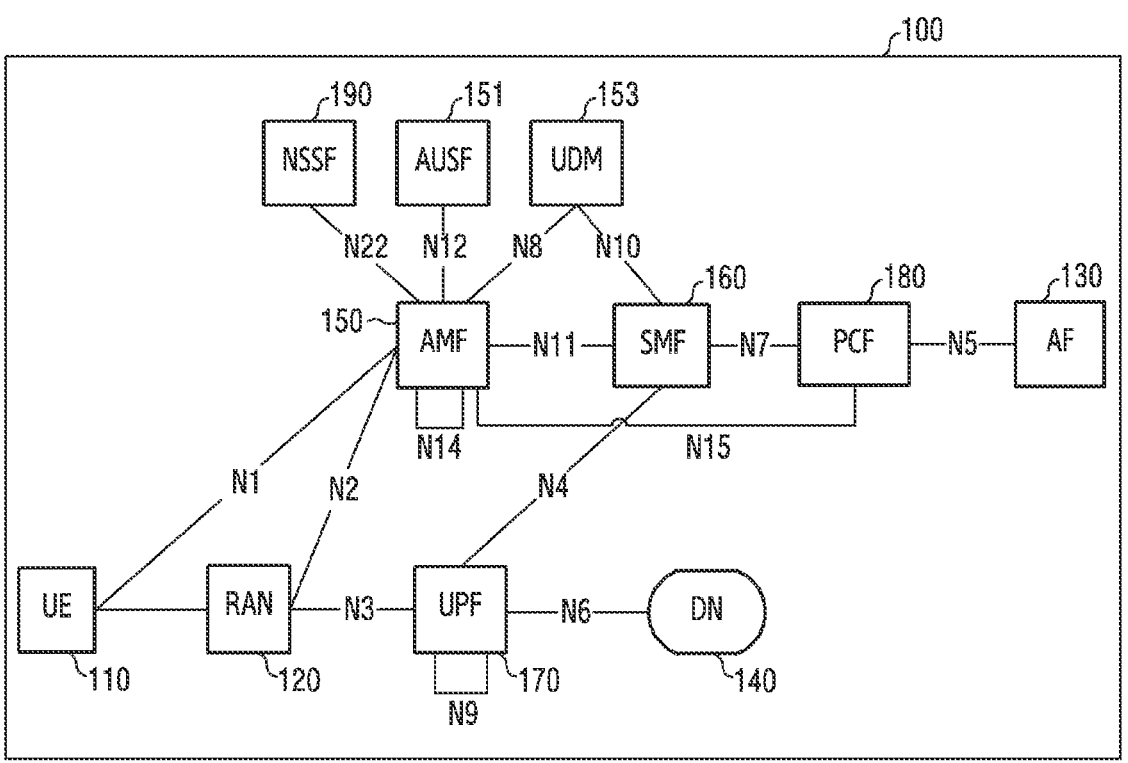
FIG. 1A is a diagram illustrating a communication network including core network entities in a wireless communication system, according to an embodiment.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure are described based on an approach of hardware. However, various embodiments of the disclosure include a technology that uses both hardware and software, and thus, the various embodiments of the disclosure may not exclude the perspective of software.

3rd Generation Partnership Project (3GPP), which manages cellular mobile communication standards, has introduced a new core network structure named 5G core (5GC) and has been standardizing same in order to push evolution from a conventional 4G LTE system to a 5G system (5GS). 5GC may support the following distinguishable functions, compared to an evolved packet core (EPC), which is a network core for the existing 4G.

First, in 5GC, a network slicing function is introduced. According to requirements of 5GC is required to support various types of terminal types and services (e.g., eMBB, URLLC, or mMTC services). Various types of services require different requirements from a core network. For example, eMBB service requires a high data rate, and URLLC service requires a high stability and a low latency. One of the techniques proposed to satisfy these various service requirements is network slicing.

Network slicing is a method of virtualizing one physical network to create several logical networks, and respective network slice instances (NSIs) may have different characteristics. Therefore, each NSI may have a network function (NF) matching the characteristic thereof, and thus, various service requirements may be satisfied. When an NSI suitable for the characteristic of a required service is assigned to each terminal, various 5G services may be efficiently supported.

Second, 5GC may easily support a network virtualization paradigm by separating a mobility management function and a session management function. In 4G long-term evolution (LTE), service provision has been possible through signaling exchange with a single core equipment, which is a mobility management entity (MME) serving as registration, authentication, mobility management, and session management functions for all terminals. However, in 5G, the number of terminals has grown explosively, and mobility and traffic/session characteristics required to be supported are subdivided according to each terminal type. Accordingly, if a single equipment, such as an MIME, supports all functions, a decrease in scalability indicating entity addition for each required function is inevitable. Therefore, in order to improve scalability in terms of signaling loads and the function/implementation complexity of core equipment responsible for a control plane, various functions are being developed based on a structure of separating a mobility management function from a session management function.

Through the development of open-source tools and hacking techniques enabling easy manufacture of false base stations and mobile communication terminals, it has become easier for an aggressor to perform a DoS attack against a user and a communication service provider by using a false base station. Accordingly, a method for preventing a DoS attack from a false base station is required. For example, there may be an attack against system information (SI) (hereinafter, SI may include an SI message or an SI block) among messages broadcast by a base station. A false base station may modify and broadcast an SI message. When a terminal uses the SI message transmitted by the false base station, the terminal may camp on the false base station rather than a base station that the terminal needs to access. The false base station may relay a message between the terminal and the base station requiring access by the terminal. If the message is not ciphered, the false base station may identify information included in the message, and if the message is ciphered, may intercept and drop a packet to prevent a user from receiving a desired service.

SI is a message broadcast to all UEs, and the protection thereof was not strongly required in the past. However, since the development of open-source tools and hacking techniques facilitates an attack using a false base station, it may be possible for a false base station to attack a terminal by making the terminal camp on the false base station by using an SI message transmitted by a base station (e.g., this is used together with the term of a "genuine base station") that the terminal needs to access. Therefore, there is an emerging need for enabling a terminal to determine whether SI is transmitted by a genuine base station, through protection of the SI. Application of a security technology for retransmission prevention and integrity protection is required for preventing a false base station from modifying and using system information. In addition, studies on an asymmetric key-based signature technique are progressing. The asymmetric key-based signature technique may include a certificate-based asymmetric key signature technique and an ID-based asymmetric key signature technique. Various embodiments of the disclosure provide a method and a device for, when an asymmetric key-based signature technique is used, provisioning a terminal with a public key for verifying, by the terminal, SI signed by a base station.

According to embodiments of the disclosure, a false base station is a base station that a terminal does not want to access, unlike a genuine base station that a terminal needs to access, and may be called an aggressor base station, a fake base station, or various expressions similar or equivalent thereto. In addition, a genuine base station is a base station that a terminal needs to access, and may be called a victim base station, a real base station, or various expressions similar or equivalent thereto. Operations described hereinafter may mainly indicate operations between a terminal and a genuine base station, and in this case, a base station may indicate a genuine base station that a terminal needs to access.

Hereinafter, embodiments of the disclosure will be described in detail in conjunction with the accompanying drawings. In describing embodiments of the disclosure, a detailed description of known functions or configurations incorporated herein will be omitted when it is determined that the description may make the subject matter of the disclosure unnecessarily unclear.

In the accompanying drawings, some elements may be exaggerated, omitted, or schematically illustrated. Further, the size of each element does not completely reflect the actual size. In the drawings, identical or corresponding elements are provided with identical or corresponding reference numerals.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). In some alternative implementations, the functions noted in the blocks may occur out of order. For example, two blocks shown in succession may in fact be executed substantially concurrently or the blocks may sometimes be executed in the reverse order, depending upon the functionality involved.

As used in embodiments of the disclosure, a unit refers to a software element or a hardware element, such as a field programmable gate array (FPGA) or an application specific integrated circuit (ASIC), which performs a predetermined function. However, the term "unit" does not always have a meaning limited to software or hardware. A unit may be constructed either to be stored in an addressable storage medium or to execute one or more processors. Therefore, a unit includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by a unit may be either combined into a smaller number of elements, or a unit, or divided into a larger number of elements, or a unit. Moreover, the elements and units may be implemented to reproduce one or more CPUs within a device or a security multimedia card.

Herein, a base station is an entity that allocates resources to terminals, and may be at least one of an eNode B (eNB), a Node B, a base station (BS), a radio access network (RAN), an access network (AN), an RAN node, an NR Node B (NB), a gNode B (gNB), a wireless access unit, a base station controller, and a node on a network. A terminal may include a UE, a mobile station (MS), a cellular phone, a smartphone, a computer, or a multimedia system capable of performing communication functions. Furthermore, in the following description of various embodiments, systems based on LTE, LTE-A, or NR may be described by way of example, but various embodiments of the disclosure may also be applied to other communication systems having similar technical backgrounds or channel types. In addition, based on determinations by those skilled in the art, the embodiments of the disclosure may also be applied to other communication systems through some modifications without significantly departing from the scope of the disclosure.

Herein, terms for identifying access nodes, terms referring to network entities, terms referring to messages, terms referring to interfaces between network entities, terms referring to various identification information, and the like are illustratively used for the sake of descriptive convenience. Therefore, the disclosure is not limited by the terms as used below, and other terms referring to subjects having equivalent technical meanings may be used.

The disclosure explain various embodiments by means of terms used in some communication specifications (e.g., 3 rd generation partnership project (3GPP)), but the terms merely correspond to examples. Various embodiments of the disclosure may also be easily modified and then applied to other communication systems. Hereinafter, some terms used in a core network of the disclosure are defined in advance.

AMF Access and Mobility Management Function
CN Core Network
CNF Containerized Network Function
DNN Data Network Name
PCIS Policy Control Function
HSS Home Subscriber Server
SMF Session Management Function
UDM User Data Management
UPF User Plane Function
CNF Containerized Network Function
VNF Virtual Network Function FIG. 1A is a diagram illustrating a communication network including core network entities in a wireless communication system, according to an embodiment. A 5G mobile communication network may include a 5G UE 110, a 5G RAN 120, and a 5G core network.

The 5G core network may include network functions including an AMF 150 that provides a mobility management function for the UE, a SMF 160 that provides a session management function, a UPF 170 that performs a data transfer role, a PCF 180 that provides a policy control function, a UDM 153 that provides a function of managing data, such as subscriber data and policy control data, or a unified data repository (UDR) that stores data of various network functions.

Referring to FIG. 1A, the terminal (e.g., UE) 110 may perform communication through a wireless channel, that is, an access network, which is established between the terminal and a base station (e.g., eNB or gNB). The terminal 110 is a device that is used by a user, and may be a device configured to provide a user interface (UI). For example, the UE 110 may be a terminal equipped in a vehicle for driving. Alternatively, the terminal 110 may be a device that performs machine type communication (MTC) operated without the user's involvement, or an autonomous vehicle. The UE may also be referred to an electronic device, a terminal, a vehicle terminal, a mobile station, a subscriber station, a remote terminal, a wireless terminal, a user device, or other terms having a technical meaning equivalent thereto. As a terminal, a customer-premises equipment (CPE) or a dongle type terminal may be used other than a UE. The CPE may be connected to a next generation-radio access network (NG-RAN) node like a UE, and provide a network to other communication equipment (e.g., a laptop).

The AMF 150 may provide a function for mobility management and access in a unit of the terminal 110, and the terminal 110 may be connected to one AMF 150. Specifically, the AMF 150 may perform at least one function among signaling between core network nodes for mobility between 3GPP access networks, interface (e.g., N2 interface) with the radio access network (e.g., 5G RAN) 120, NAS signaling with the terminal 110, identification of the SMF 160, transfer and provision of a session management (SM) message between the terminal 110 and the SMF 160. Some or all functions of the AMF 150 may be supported in a single instance of one AMF 150.

The SMF 160 may provide a session management function, and when the terminal 110 has multiple sessions, the sessions may be managed by different SMFs 160. Specifically, the SMF 160 may perform at least one function among session management (e.g., session establishment, modification, and release with tunnel maintenance between the UPF 170 and an access network node), selection and control of a user plane (UP) function, traffic steering configuration for routing traffic from the UPE 170 to a proper destination, an entity of the SM part of a NAS message, downlink data notification (DDN), an originator of AN-specific SM information (e.g., transfer to the access network through N2 interface via the AMF 150). Some or all functions of the SMF 160 may be supported in a single instance of one SMF 160.

In a 3GPP system, conceptual links connecting NFs in a 5GS may be referred to as reference points. A reference point may also be referred to as an interface. The following description exemplifies a reference point (hereinafter, this is used together with an interface) included in a 5GS architecture represented in various embodiments of the disclosure.

N1: A reference point between the UE 110 and the AMF 150

N2: A reference point between the (R)AN 120 and the AMF 150

N3: A reference point between the (R)AN 120 and the UPF 170

N4: A reference point between the SMF 160 and the UPF 170

N5: A reference point between the PCF 180 and an AF 130

N6: A reference point between the UPF 170 and a DN 140

N7: A reference point between the SMF 160 and the PCF 180

N8: A reference point between the UDM 153 and the AMF 150

N9: A reference point between two core UPFs 170

N10: A reference point between the UDM 153 and the SMF 160

N11: A reference point between the AMF 150 and the SMF 160

N12: A reference point between the AMF 150 and an authentication server function (AUSF) 151

N13: A reference point between the UDM 153 and the authentication server function 151

N14: A reference point between two AMFs 150

Figure 1B:
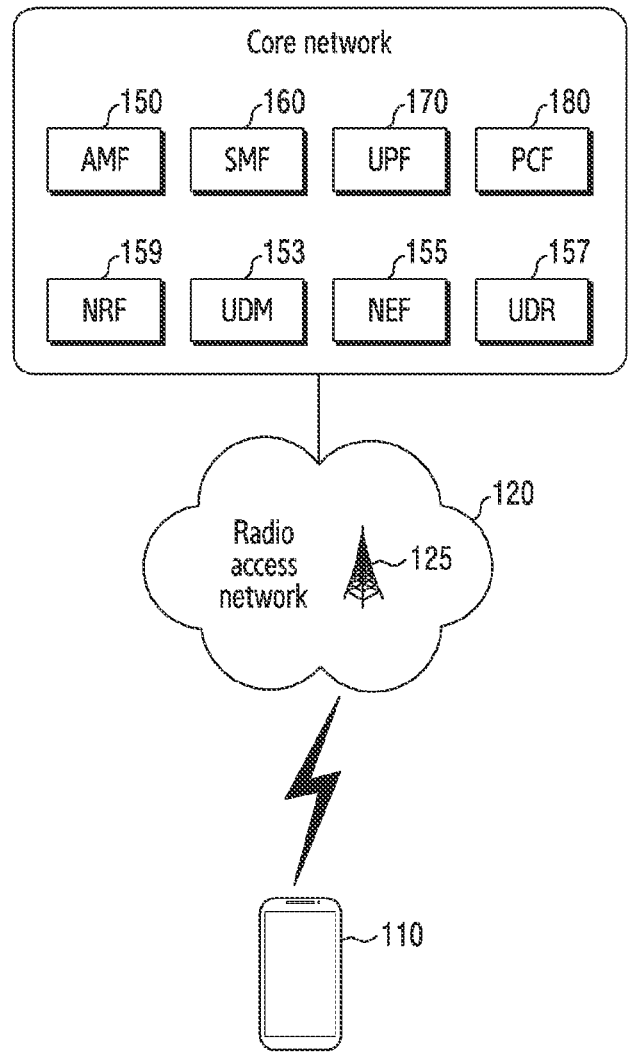
FIG. 1B is a diagram illustrating a wireless environment including a core network in a wireless communication system, according to an embodiment.

N15: In a non-roaming scenario, a reference point between the PCF 180 and the AMF 150, and in a roaming scenario, a reference point between the AMF 150 and the PCF 180 in a visited network FIG. 1B is a diagram illustrating a wireless environment including a core network in a wireless communication system, according to an embodiment. Referring to FIG. 1B, a wireless communication system includes the RAN 120 and a CN.

The RAN 120 is a network directly connected to a UE, for example, the terminal 110, and an infrastructure that provides wireless access to the terminal 110. The RAN 120 includes a set of multiple base stations including a base station 125, and the multiple base stations may perform communication through interfaces established between them. At least some of the interfaces between the multiple base stations may be wired or wireless. The base station 125 may have a structure in which a central unit (CU) and a distributed unit (DU) are separated from each other. In this case, one CU may control multiple DUs. The base station 125 may also be referred to as an access point (AP), a gNB, a 5G node, a wireless point, a transmission/reception point (TRP), or other terms having a technical meaning equivalent thereto. The terminal 110 accesses the radio access network 120 and communicates with the base station 125 through a wireless channel. The terminal 110 may also be referred to as a UE, a mobile station, a subscriber station, a remote terminal, a wireless terminal, a user device, or other terms having a technical meaning equivalent thereto.

The CN is a network that manages the entire system, and controls the RAN 120 and processes data and control signals for the terminal 110, which is transmitted or received via the RAN 120. The CN performs various functions including control a user plane and a control plane, processing of mobility, management of subscriber information, charging, and linking to a different type of system (e.g., LTE system). In order to perform the various functions, the core network may include multiple entities that have different NFs and are functionally separated from each other. For example, the CN 200 may include the AMF 150, the SMF 160, the UPF 170, the PCF 180, a network repository function (NRF) 159, the UDM 153, a network exposure function (NEF) 155, and a UDR 157.

The terminal 110 accesses the AMF 150 that is connected to the RAN 120 and performs a mobility management function for the core network. The AMF 150 is a function or a device that serves both access of the radio access network 120 and mobility management for the terminal 110. The SMF 160 is an NF that manages a session. The AMF 150 is connected to the SMF 160, and the AMF 150 routes a session-related message for the terminal 110 to the SMF 160. The SMF 160 connects to the UPF 170 and allocates a user plane resource to be provided to the terminal 110, and establishes a tunnel between the base station 125 and the UPF 170 for data transmission. The PCF 180 controls information related to charging and a policy for a session used by the terminal 110.

The NRF 159 performs a function of storing information on NFs installed in a mobile communication service provider network, and notifying of the stored information. The NRF 159 may be connected to all NFs. Each NF is registered in the NRF 159 when the service provider network operates same, thereby notifying the NRF 159 that a corresponding NF is being operated in the network. The UDM 153 is an NF that performs a role similar to that of a home subscriber server (HSS) of a 4G network, and stores subscription information of the terminal 110 or context used by the terminal 110 in a network.

The NEF 155 performs a role of connecting a third party (3 rd party) server to an NF in a 5G mobile communication system. In addition, the NEF performs a role of providing data to the UDR 157 or updating same, or obtaining data. The UDR 157 performs a function of storing subscription information of the terminal 110, storing policy information, storing data exposed to the outside, or storing information required for a third party application. In addition, the UDR 157 performs a role of providing stored data to another NF.

Figure 2A:
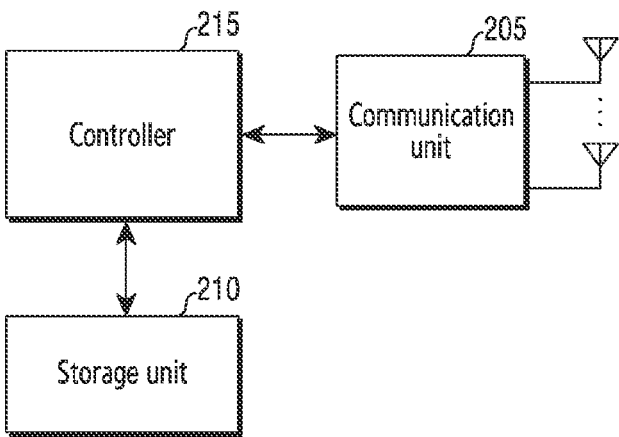
FIG. 2A is a diagram illustrating an example of a functional structure of a terminal, according to an embodiment.

FIG. 2A is a diagram illustrating an example of a functional structure of a terminal, according to an embodiment. A configuration illustrated in FIG. 2A may be understood as a configuration of the terminal 110. Terms ending with "unit" or including the suffixes "or", "er", or the like used herein may refer to a unit of processing at least one function or operation, and this may be embodied by hardware, software, or a combination of hardware and software.

Referring to FIG. 2A, a terminal includes a communication unit 205, a storage unit 210, and a controller 215.

The communication unit 205 performs functions for transmitting or receiving a signal through a wireless channel. For example, the communication unit 205 may perform a function of conversion between a baseband signal and a bitstream according to physical layer specifications of a system. For example, when data is transmitted, the communication unit 205 generates complex symbols by encoding and modulating a transmission bit stream. Furthermore, when data is received, the communication unit 205 reconstructs a reception bit stream by demodulating and decoding a baseband signal. Furthermore, the communication unit 205 up-converts a baseband signal into an RF band signal and then transmits the converted RF band signal through an antenna, and down-converts an RF band signal received through an antenna into a baseband signal. For example, the communication unit 205 may include a transmission filter, a reception filter, an amplifier, a mixer, an oscillator, a digital-to-analog converter (DAC), an analog-to-digital converter (ADC), and the like.

In addition, the communication unit 205 may include a plurality of transmission/reception paths. Furthermore, the communication unit 205 may include at least one antenna array including a plurality of antenna elements. In view of hardware, the communication unit 205 may be configured by a digital circuit and an analog circuit (e.g., radio-frequency integrated circuit (RFIC)). The digital circuit and the analog circuit may be implemented as a single package. In addition, the communication unit 205 may include a plurality of radio frequency (RF) chains. Moreover, the communication unit 205 may perform beamforming.

The communication unit 205 transmits and receives a signal as described above. Accordingly, the entirety or a part of the communication unit 205 may be referred to as a transmitter, a receiver, or a transceiver. Furthermore, in the following description, transmission and reception performed through a wireless channel is used as a meaning of including the above processing being performed by the communication unit 205.

The storage unit 210 stores data such as a basic program, an application program, and configuration information for an operation of the terminal. The storage unit 210 may be configured as a volatile memory, a nonvolatile memory, or a combination of a volatile memory and a nonvolatile memory. The storage unit 210 provides stored data according to a request of the controller 215.

The controller 215 controls overall operations of the terminal. For example, the controller 215 transmits and receives a signal through the communication unit 205. In addition, the controller 215 records and reads data in and from the storage unit 210. Moreover, the controller 215 may perform functions of a protocol stack required in a communication specification. To this end, the controller 215 may include at least one processor or microprocessor, or may be a part of a processor. In addition, the controller 215 and a part of the communication unit 205 may be referred to as a communication processor (CP). The controller 215 may perform control such that synchronization using a wireless communication network is performed. For example, the controller 215 may control the terminal to perform operations according to various embodiments.

The terminal may be configured by a mobile equipment (ME) and a universal mobile telecommunications service (UMTS) subscriber identity module (USIM). The ME may include a mobile terminal (MT) and a terminal equipment (TE). The MT may be a part where a wireless access protocol operates, and the TE may be a part where a control function operates. For example, in a wireless communication terminal (e.g., a mobile phone), the MT and the TE may be integrated with each other, and in a notebook, the MT and the TE may be separated from each other. The disclosure may represent the ME and the USIM as entities distinguished from each other according to an operation of each element, but is not limited thereto, and may express a terminal (e.g., UE) including the ME and the USIM, or express the ME as a terminal.

Figure 2B:
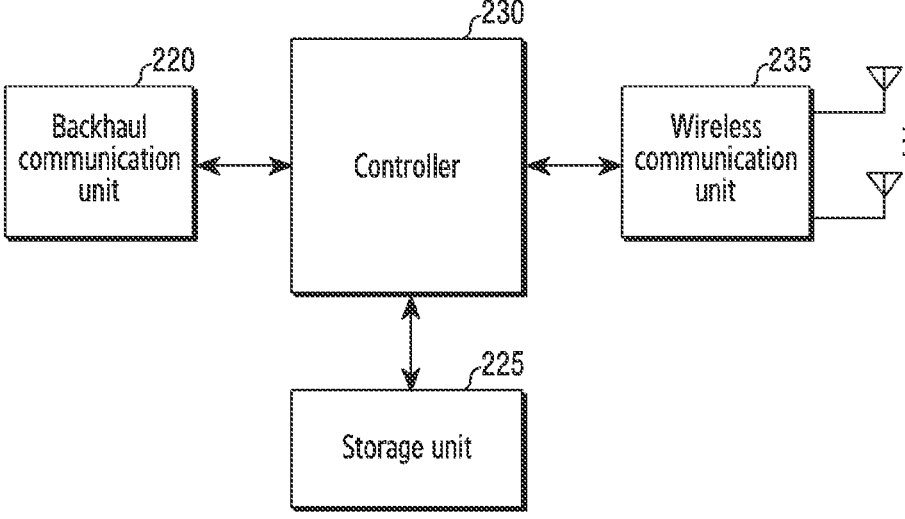
FIG. 2B is a diagram illustrating an example of a functional structure of a base station, according to an embodiment.

FIG. 2B is a diagram illustrating an example of a functional structure of a base station, according to an embodiment. A configuration illustrated in FIG. 2B may be understood as a configuration of the base station 120.

Referring to FIG. 2B, a base station includes a wireless communication unit 235, a backhaul communication unit 220, a storage unit 225, and a controller 230.

The wireless communication unit 235 performs functions for transmitting or receiving a signal through a wireless channel. For example, the wireless communication unit 235 may perform a function of conversion between a baseband signal and a bitstream according to physical layer specifications of a system. For example, when data is transmitted, the wireless communication unit 235 generates complex symbols by encoding and modulating a transmission bit stream. Furthermore, when data is received, the wireless communication unit 235 reconstructs a reception bit stream by demodulating and decoding a baseband signal.

Furthermore, the wireless communication unit 235 up-converts a baseband signal into an RF band signal and then transmits the converted RF band signal through an antenna, and down-converts an RF band signal received through an antenna into a baseband signal. To this end, the wireless communication unit 235 may include a transmission filter, a reception filter, an amplifier, a mixer, an oscillator, a DAC, an ADC, and the like. In addition, the wireless communication unit 235 may include a plurality of transmission/reception paths. Furthermore, the wireless communication unit 235 may include at least one antenna array configured by multiple antenna elements.

In view of hardware, the wireless communication unit 235 may be configured by a digital unit and an analog unit, and the analog unit may include a plurality of sub-units according to operating power, operating frequency, etc. The digital unit may be implemented as at least one processor (e.g., a digital signal processor (DSP)).

The wireless communication unit 235 transmits and receives a signal as described above. Accordingly, the entirety or a part of the wireless communication unit 235 may be referred to as a transmitter, a receiver, or a transceiver. Furthermore, in the following description, transmission and reception performed through a wireless channel is used as a meaning of including the above processing being performed by the wireless communication unit 235.

The backhaul communication unit 220 provides an interface for performing communication with other nodes within a network. That is, the backhaul communication unit 220 converts, into a physical signal, a bitstream transmitted from the base station to another node, for example, another access node, another base station, a higher node, a core network, etc., and converts a physical signal received from another node into a bitstream.

The storage unit 225 stores data such as a basic program, an application program, and configuration information for an operation of the base station. The storage unit 225 may be configured as a volatile memory, a nonvolatile memory, or a combination of a volatile memory and a nonvolatile memory. The storage unit 225 provides stored data according to a request of the controller 230.

The controller 230 controls overall operations of the base station. For example, the controller 230 transmits and receives a signal through the wireless communication unit 235 or the backhaul communication unit 220. In addition, the controller 230 records and reads data in and from the storage unit 225. In addition, the controller 230 may perform functions of a protocol stack required in a communication protocol. Alternatively, the protocol stack may be included in the wireless communication unit 235. To this end, the controller 230 may include at least one processor. The controller 230 may perform control such that synchronization using a wireless communication network is performed. For example, the controller 230 may control the base station to perform operations according to embodiments.

Figure 2C:
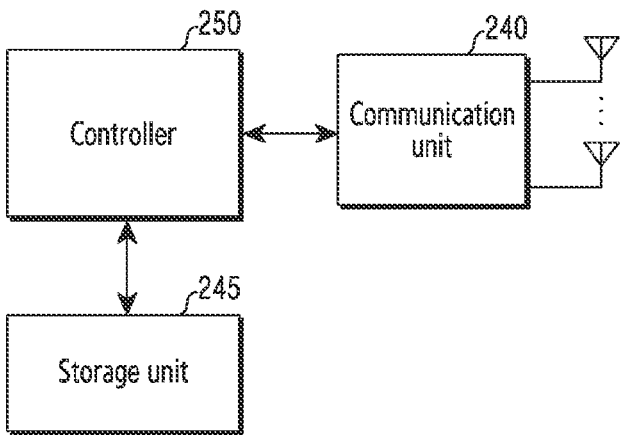
FIG. 2C is a diagram illustrating an example of a functional structure of a core network entity, according to an embodiment.

FIG. 2C is a diagram illustrating an example of a functional structure of a core network entity, according to an embodiment. In a wireless communication system, a configuration of a core network entity is illustrated. A configuration illustrated in FIG. 2C may be understood as a configuration of a device having at least one function among network entities including the AMF 150 of FIG. 1.

Referring to FIG. 2C, a core network entity includes a communication unit 240, a storage unit 245, and a controller 250.

The communication unit 240 provides an interface for performing communication with other devices within a network. That is, the communication unit 240 converts, into a physical signal, a bitstream transmitted from the core network entity to another device, and converts a physical signal received from another device into a bitstream. That is, the communication unit 240 may transmit and receive a signal. Accordingly, the communication unit 240 may be referred to as a modem, a transmitter, a receiver, or a transceiver. The communication unit 240 may allow the core network entity to communicate with other devices or a system through backhaul connection (e.g., wired backhaul or wireless backhaul) or a network.

The storage unit 245 stores data such as a basic program, an application program, and configuration information for an operation of the core network entity. The storage unit 245 may be configured as a volatile memory, a nonvolatile memory, or a combination of a volatile memory and a nonvolatile memory. The storage unit 245 provides stored data according to a request of the controller 250.

The controller 250 controls overall operations of the core network entity. For example, the controller 250 transmits or receives a signal via the communication unit 240. In addition, the controller 250 records and reads data in and from the storage unit 245. To this end, the controller 250 may include at least one processor. The controller 250 may perform control such that synchronization using a wireless communication network is performed. For example, the controller 250 may control the core network entity to perform operations according to embodiments.

Herein, a term for identifying an access node, a term for indicating network entities, a term for indicating messages, a term for indicating an interface between network entities, a term for indicating various identification information, and the like are examples for convenience of explanation. Therefore, the disclosure is not limited by the terminologies provided below, and other terms that indicate objects having equivalent technical meanings may be used.

Hereinafter, for convenience of explanation, terms and names are used that are defined in 5GS and NR specifications. However, the disclosure is not limited to the terms and names, and may be applied to a wireless communication network following other specifications in the same way. Especially, the disclosure may be applied to a 3GPP 5G mobile communication standard (e.g., 5GS and NR).

A base station may have a private key to be used to sign an SI message. A terminal may have a public key capable of verifying a value with which an SI message is signed using the private key of the base station. As one method of provisioning a public key to a terminal, a method of provisioning and selling the public key to a USIM by a communication service provider may be provided. Alternatively, after a mutual authentication process with a core network, a terminal may receive a NAS security mode command or access stratum (AS) security mode command message, which is initially subjected to integrity protection, and receive a public key capable of verifying a value of a signature provided by a base station which the terminal wants to access. Alternatively, after a process of registering a terminal is completed, a network may update a public key for the terminal through a UE parameters update (UPU) or steering of roaming (SoR) process if necessary.

The terminal may store a public key to be used for signature verification in a USIM or an ME. In a case where a public key is storable in the USIM, if system information transmitted by the base station includes a signature, the terminal (e.g., ME) may use an interface with the USIM to perform a process of receiving the public key from the USIM. Alternatively, the terminal may transfer an SI message to the USIM, and the USIM may perform a process of verifying the transferred message.

A storage type of a public key for signature verification may correspond to mapping a public land mobile network (PLMN) ID to the ID or index of the public key and storing same in a non-volatile memory (NVM) of the ME or the USIM (e.g., this type may be a PLMNID+public key identifier (PKID)|public key (PK) form). The terminal may identify a PLMN ID and a PK ID in system information transmitted by the base station. The terminal may identify a PK capable of verifying a signature of a corresponding PLMN in the NVM of the USIM or the ME, and verify the signature of the SI, and may identify whether the base station is authentic, based on the verification.

When broadcasting SI, a base station may transmit the system information together with a PKID representing a public key capable of verifying a value of a signature provided by the base station.

A terminal may receive a public key of each base station which is to be used to verify signatures with which a base station on which the terminal is currently camping and other base stations sign SI, through a protected message according to a NAS security mode command/AS security mode command during a registration process, or UPU/SoR after the registration process.

A terminal may store, in an NVM of a USIM or ME, a key provisioned from a network during or after a registration process, and may verify a signature included SI transmitted by a genuine base station, by using the stored key.

As described above, a false base station may swindle or forge system information of a genuine base station that a terminal needs to access. In order to solve this problem, various methods may be required.

A base station may transmit or broadcast SI including information related to the base station, and a terminal may receive the SI from the base station. The information related to the base station included in the SI may include at least one of a physical cell ID (PCI), a timestamp, and a signature value of a base station for the system information.

The terminal having received system information including a PCI from the base station may verify a signature of the base station having transmitted the SI message, based on a PCI value of a genuine base station that the terminal needs to access. Alternatively, the terminal may identify, based on received information on a timestamp, whether received system information is system information that has been transmitted by a base station required to be accessed or system information recycled by a false base station.

An asymmetric key-based method may be used. Unlike a symmetric key method in which one key is shared and used, the asymmetric key-based method may include a public key and private key. The asymmetric key-based method may include a certificate-based digital signature method and an ID-based signature method.

More specifically, in the certificate-based digital signature method, a base station may sign using a private key among a pair of the private key and a public key, and a terminal may verify a signature by using the public key of the base station (e.g., included in a certificate). The terminal may already have a public key of a root certificate authority (CA) having issued a certificate to the base station. In the ID-based signature method, a terminal may verify a signature by using a key management service (KMS) public key. In the asymmetric key-based method, a terminal may be assumed to already have a public key (e.g., a public key of a root CA or a KMS public key). Accordingly, a method and a device for transmitting or receiving a signal, based on a more reinforced security of a base station by individually and adaptively provisioning a public key to a terminal are disclosed.

Figure 3:
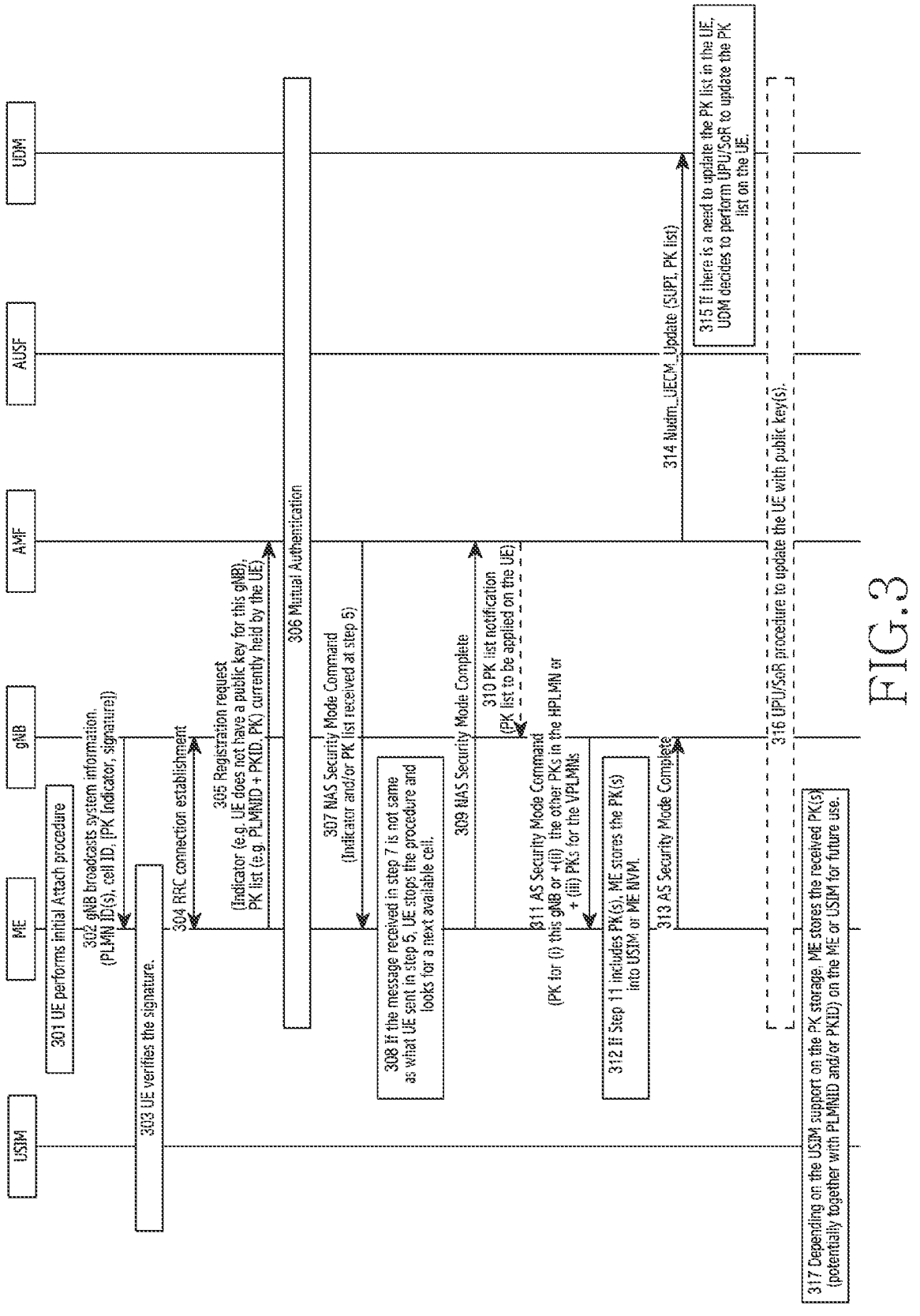
FIG. 3 is a diagram illustrating an example of a flow of a signal for a terminal to receive a public key for verifying a base station, according to an embodiment.

FIG. 3 is a diagram illustrating an example of a flow of a signal for a terminal to receive a public key for verifying a base station, according to an embodiment.

FIG. 3 shows operations including a stage of public key updating by a network for a terminal already having a public key for signature verification, as well as a stage of provisioning to a terminal not having a public key for signature verification.

Various embodiments may be implemented to include at least one of the stages illustrated in FIG. 3. For example, referring to FIG. 3, some or all of the operations of stage 305 to stage 312, which are a part of a process of registering a terminal, may be omitted or may be replaced with other operations according to various embodiments of the disclosure. Various embodiments of the disclosure may include all of the operations of FIG. 3, some of them, or a combination of some operations, or may include a combination with some of the operations illustrated in FIG. 4.

One or more of the following configurations may be performed in advance for the procedure illustrated in FIG. 3.
First Pre-Configuration A server of a first service provider may have a public key capable of being used for signature verification in a network of a second service provider in a contractual relationship (e.g., a roaming contract).
Second Pre-Configuration An AMF may have at least one of a public key for a signature verification for a gNB which is connectable with the AMF, a public key(s) for other base stations in a home public land mobile network (HPLMN), or a public key for base stations of visited PLMNs (VPLMNs). Alternatively, the gNB may have the above information. Alternatively, during a registration process, the AMF may receive a public key list including at least one of the above public keys from a UDM.

Referring to FIG. 3, at 301, a terminal may perform an initial attach process.

At 302, a base station may broadcast SI including a signature. When the SI transmitted by the base station includes a signature, the SI may include an indicator (PK indicator) (e.g., a certificate including a public key of the base station or a public key ID indicating a public key for signature verification) indicating a public key for signature verification. The base station may use, as an additional input, a value of a PCI or a timestamp in order to make a signature. In addition, the SI transmitted by the base station may include at least one of a PLMN ID or cell ID related to the base station.

According to an embodiment, the terminal having received SI including a PCI from the base station may verify a signature of the base station having transmitted the SI, based on a PCI value of a genuine base station that the terminal needs to access. Alternatively, the terminal may identify, based on received information on a timestamp, whether received SI has been transmitted by a base station required to be accessed or recycled by a false base station.

At 303, the terminal may perform an operation, based on the received system information. If the SI is a message related to a disaster text message and the SI including a disaster text message does not include signature information, the terminal may identify that this disaster text message is not verified (e.g., the terminal may provide a notification that "this is an unverified disaster text message"). Regardless of whether the terminal has a public key for base station verification, if a changeable value (e.g., timestamp) included in the SI is not acceptable to the terminal (e.g., the changeable value is an old time value in determination of the terminal), the terminal may stop the above operation, escape from the base station (or a cell of the base station) having transmitted the SI, and select another cell. The terminal may verify the signature. More specifically, the terminal may verify SI signed based on a private key by the base station, based on a public key of the base station which the terminal is aware of. An asymmetric key method is used, and thus the public key and the private key may be different. The terminal may identify that verification of the base station is completed based on the public key corresponding to the private key used for signing.

When the SI received by the terminal in stage 302 does not include a signature, the terminal may proceed to stage 304 without an additional operation.

In a case where the SI includes a signature and a USIM of the terminal supports a function of storing a public key to be used for signature verification, an ME may receive or identify, from or in the USIM, a public key (a corresponding CA certificate in a case of a certificate including the public key of the base station, or a public key matching a corresponding ID in a case of a public key ID indicating a public key for signature verification) corresponding to information on the public key included in the system information.

In a case where the SI includes a signature and the USIM of the terminal does not have a function of storing a public key to be used for signature verification, the ME may identify, in a memory of the ME, a public key corresponding to information on the public key included in the SI.

When a public key is identified in the memory of the USIM or ME, the terminal may verify the signature included in the SI. When verification is successful, the terminal may proceed to stage 304. When verification fails, the terminal may identify that there is an aggressor base station (e.g., a false base station). When verification fails, the terminal may search for another cell and make an attempt to attach. When the terminal has determined that the base station having transmitted the SI to the terminal is an aggressor base station, the terminal may stop a procedure (e.g., a cell access procedure) of connecting to the base station having transmitted the SI, and search for another cell (or base station). When the terminal has determined that the base station having transmitted the SI to the terminal is a genuine base station, the terminal may continue a procedure of connecting to the base station having transmitted the SI.

When the terminal fails to find a public key in the memory of the USIM or ME, the terminal may proceed to stage 304.

At 304, the terminal and the base station may perform RRC connection configuration. An initial access process may be performed for a process of RRC connection configuration between the terminal and the base station.

Figure 4:
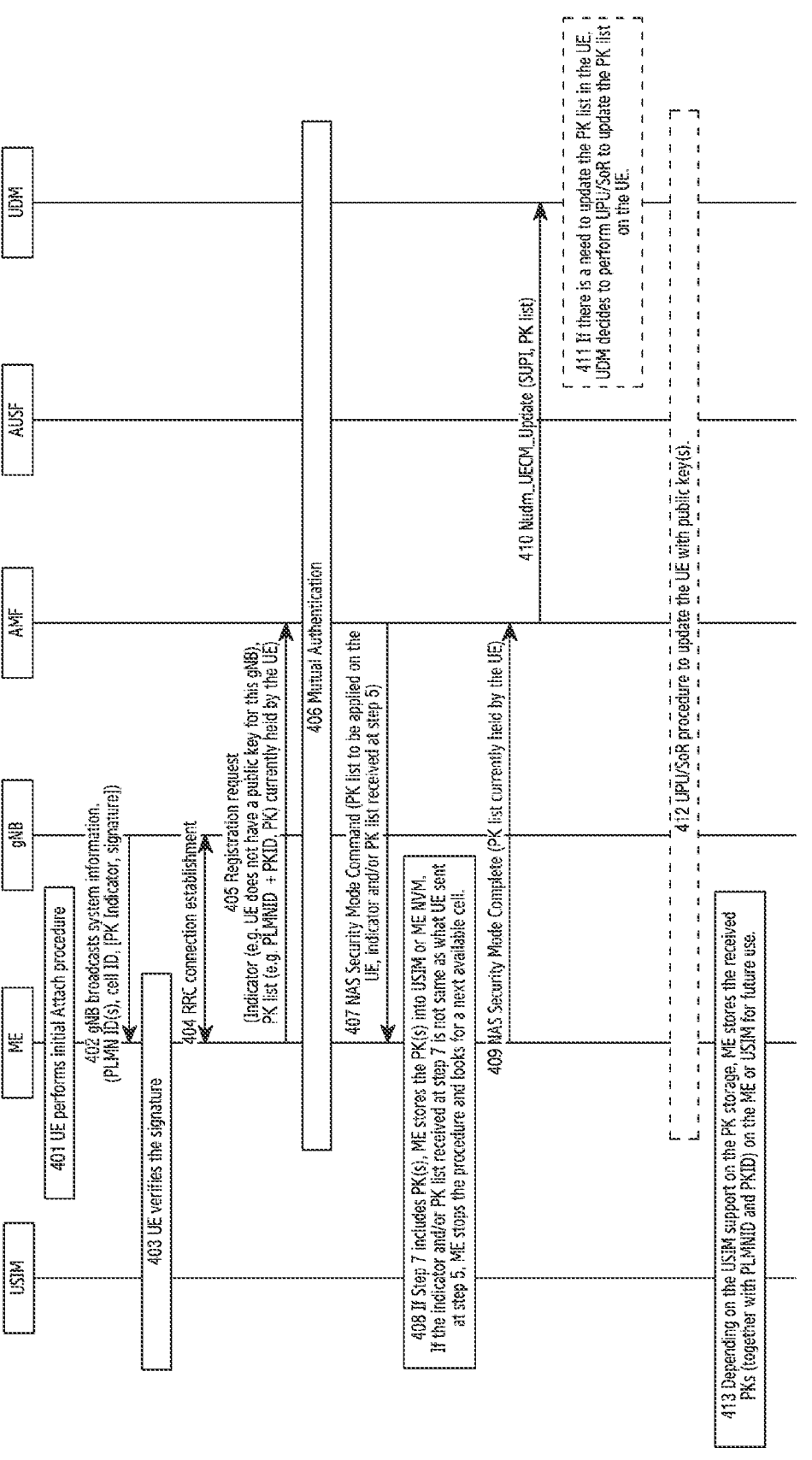
FIG. 4 is a diagram illustrating an example of a flow of a signal for a terminal to receive a public key for verifying a base station, according to an embodiment.

From 301 to 303 of FIG. 3, the terminal may succeed or fail to verify the signature of the base station, and for a resultant additional verification process, some of the stages of FIG. 3 or some of the stages of FIG. 4 may be performed.

At 305, the terminal may transfer a registration request message to an AMF via the base station. The registration request message transmitted by the terminal may include information on a ciphering and integrity protection algorithm supported by the terminal. The registration request message transmitted by the terminal may include at least one in a list of public keys which are currently held by the terminal and are to be used for signature verification. When there is no public key for verifying a value of a signature provided by a base station that the terminal needs to access, the registration request message transmitted by the terminal may include an indicator indicating such information, or at least one in a list of public keys which are currently held by the terminal and are to be used for signature verification. The list of public keys may include, for example, the public keys themselves, or information (e.g., PLMNID+PKID) indicating the public keys. When there is an aggressor base station (e.g., a false base station), the false base station may receive the registration request message transmitted by the terminal, modifies information including the message, and transmit the message to the AMF.

At 306, the terminal and a network (e.g., including the base station or core network entities) may perform mutual authentication.

At 307, the AMF may not modify an indicator or a public key list included in the message received from the terminal. The AMF may transmit a NAS security mode command message including the indicator or the public key list received from the terminal. The AMF may identify a ciphering and integrity protection algorithm related to NAS message transmission or reception which is performed with the terminal. The AMF may identify a ciphering and integrity protection algorithm related to NAS message transmission or reception, based on the information on the ciphering and integrity protection algorithm supported by the terminal, the information being received from the terminal. The AMF may generate a ciphering key or an integrity protection key for NAS, based on the identified algorithm and K_amf. The AMF may perform integrity protection of a NAS security mode command message by using the generated integrity protection key for NAS, and transmit the message. The NAS security mode command message may be the first message, among NAS messages, which is subject to integrity protection. The message subjected to integrity protection may not be randomly modifiable by other entities (e.g., aggressor base station) before the terminal receives same. The NAS message may include at least one of the integrity protection algorithm or the ciphering algorithm selected by the AMF.

At 308, the terminal may compare the indicator or public key list included in the message subjected to integrity protection and received from the AMF, with the indicator or public key list transmitted by the terminal to the AMF in stage 305. When a comparison result indicates that the indicator or public key list transmitted by the terminal is identified to be different from the indicator or public key list received by the terminal, the terminal may identify that there has been a man-in-the-middle (MitM) attack during transmission or reception with a core network. When a comparison result indicates that the indicator or public key list transmitted by the terminal is identified to be different from the indicator or public key list received by the terminal, the terminal may identify that there is an aggressor base station (e.g., false base station). When a comparison result indicates that the indicator or public key list transmitted by the terminal is identified to be different from the indicator or public key list received by the terminal, the terminal may search for another cell and make an attempt to attach.

At 309, when the information received in stage 307 is the same as the information transmitted by the terminal in stage 305, the terminal may notify the AMF that there is no message falsification, by transmitting a NAS security mode complete message. The terminal may generate a ciphering key or an integrity protection key for NAS, based on the ciphering algorithm and the integrity protection algorithm received from the AMF at 307. The terminal may perform ciphering and integrity protection of subsequent NAS messages including the NAS security mode complete message, based on the generated keys, and transmit the messages.

At 310, when the AMF receives a NAS security mode complete message from the terminal, the AMF may identify that the information received in stage 305 has not been falsified. The AMF may identify information of a public key which is to be used for signature verification and is currently owned by the terminal, based on the information received in stage 305. When there is information required to be updated among the public keys owned by the terminal, the AMF may transfer the information to the base station. A case where update is needed may include a case where some of the public keys owned by the terminal are revoked, or a public key of a particular PLMN is added/removed due to a new contractual relationship.

At 311, the base station may update a public key for the terminal through an AS security mode command message to be subject to integrity protection, by using public key information received from the AMF. The base station may transmit a message including an updated public key to the terminal. The message transmitted to the terminal may include at least one of a public key for the base station having received the public key information from the AMF, a public key for other base stations of an HPLMN, or a public key for base stations of VPLMNs.

At 312, when a public key(s) is included in an AS security mode command message received by the terminal from the base station, the terminal may store the public key(s) in an NVM of the USIM or the ME, based on whether a USIM storage function is available. An AS security mode command may be the message that is first subjected to integrity protection, among AS messages.

At 313, the terminal may transmit an AS security mode complete message to the base station. An AS security mode complete message may be the message that is first subjected to ciphering and integrity protection, among AS messages. The message subjected to integrity protection may not be randomly modifiable by other entities (e.g., aggressor base station) before the terminal receives same.

At 314, the AMF (e.g., the AMF may recognize a public key list currently held by the terminal by combining a public key list received from the terminal in stage 305, and public key list information transferred by the AMF to the base station in stage 310) that is aware of a public key(s) held by the terminal may transfer, to a UDM, a subscription permanent identifier (SUPI) that is an identifier indicating the terminal, and a list of public keys held by the terminal.

At 315, when the UDM having received the list of public keys owned by the terminal identifies that update is needed, based on the received list of public keys, the UDM may perform a process of UPU or SoR to determine whether to update a public key for signature verification for the terminal.

At 316, when it is determined that update of the list of public keys is needed for the UE, based on the received list of public keys (e.g., a new public key for a base station newly deployed in an HPLMN has been added, information on a public key to be used in a network of another service provider has been added due to a new contractual relationship with the other service provider, or a particular public key becomes unnecessary due to discarding (revocation) of a public key owned by the terminal), the UDM may perform updating in the terminal through a UPU/SoR process.

According to an embodiment, a process of terminal updating through the UPU/SoR process may be performed by at least one of the terminal, the base station, or network entities. A process of updating the list of public keys (e.g., including at least one of a public key of the base station, a public key of other base stations of an HPLMN, or public keys of base stations of VPLMNs) for the terminal may include updating a public key for the terminal by using a UPU process, or updating public key information related to a VPLMN for the terminal by using an SoR process.

At 317, the terminal having received update information for a public key for signature verification through the UPU/SoR process may update public key information in the NVM of the USIM or the ME, based on a public key required for verification of the signature of the base station and an indicator (including a case of a PLMNID+PKID form) indicating the public key, and may store updated contents.

According to various embodiments of the disclosure, some of the stages illustrated in FIG. 3 may be performed again, based on the updated public key or public key list of the terminal.

FIG. 4 is a diagram illustrating an example of a flow of a signal for a terminal to receive a public key for verifying a base station, according to an embodiment.

FIG. 4 shows operations including a stage of public key updating by a network for a terminal already having a public key for signature verification, as well as a stage of provisioning to a terminal not having a public key for signature verification. Embodiments may be implemented to include at least one of the stages illustrated in FIG. 4. For example, referring to FIG. 4, some or all of the operations of 405 to 409, which are a part of a process of registering a terminal, may be omitted or may be replaced with other operations. Embodiments may include all of the operations of FIG. 4, some of them, or a combination of some operations, or may include a combination with some of the operations illustrated in FIG. 3. In addition, terms (e.g., information and parameter) of the disclosure are not limited to themselves, and may be replaced with terms having a meaning equivalent or similar thereto.

One or more of the following configurations may be performed in advance for the procedure illustrated in FIG. 4.
First Pre-Configuration A server of a first service provider may have a public key capable of being used for signature verification in a network of a second service provider in a contractual relationship (e.g., a roaming contract).
Second Pre-Configuration An AMF may have at least one of a public key for a signature verification for a gNB which is connectable with the AMF, a public key(s) for other base stations in an HPLMN, or a public key for base stations of VPLMNs. Alternatively, during a registration process, the AMF may receive a public key list including at least one of the above public keys from a UDM.

Referring to FIG. 4, at 401, a terminal may perform an initial attach process.

At 402, a base station may broadcast SI including a signature. When the SI transmitted by the base station includes a signature, the SI may include an indicator (PK indicator) (e.g., a certificate including a public key of the base station or a public key ID indicating a public key for signature verification) indicating a public key for signature verification. The base station may use, as an additional input, a value of a PCI or a timestamp in order to make a signature. In addition, the system information transmitted by the base station may include a PLMN ID related to the base station.

The terminal having received SI including a PCI from the base station may verify a signature of the base station having transmitted the SI, based on a PCI value of a genuine base station that the terminal needs to access. Alternatively, the terminal may identify, based on received information on a timestamp, whether received SI has been transmitted by a base station required to be accessed or recycled by a false base station.

At 403, the terminal may perform an operation, based on the received SI. If the SI is a message related to a disaster text message and the SI including a disaster text message does not include signature information, the terminal may identify that this disaster text message is not verified (e.g., the terminal may provide a notification that "this is an unverified disaster text message"). Regardless of whether the terminal has a public key for base station verification, if a changeable value (e.g., timestamp) included in the SI is not acceptable to the terminal (e.g., the changeable value is an old time value in determination of the terminal), the terminal may stop the above operation, escape from the base station (or a cell of the base station) having transmitted the SI, and select another cell. The terminal may verify the signature. More specifically, the terminal may verify, based on a public key of the base station which the terminal is aware of, SI signed by the base station, based on a private key. An asymmetric key method is used, and thus, the public key and the private key may be different. The terminal may identify that verification of the base station is completed based on the public key corresponding to the private key used for signing.

When the SI received by the terminal at 402 does not include a signature, the terminal may proceed to 404 without an additional operation.

In a case where the SI includes a signature and a USIM of the terminal supports a function of storing a public key to be used for signature verification, an ME may receive or identify, from or in the USIM, a public key (a corresponding CA certificate in a case of a certificate including the public key of the base station, or a public key matching a corresponding ID in a case of a public key ID indicating a public key for signature verification) corresponding to information on the public key included in the system information.

In a case where the SI includes a signature and the USIM of the terminal does not have a function of storing a public key to be used for signature verification, the ME may identify, in a memory of the ME, a public key corresponding to information on the public key included in the SI.

When a public key is identified in the memory of the USIM or ME, the terminal may verify the signature included in the SI. When verification is successful, the terminal may proceed to 404. When verification fails, the terminal may identify that there is an aggressor base station (e.g., a false base station). When verification fails, the terminal may search for another cell and make an attempt to attach. When the terminal has determined that the base station having transmitted the system information to the terminal is an aggressor base station, the terminal may stop a procedure (e.g., a cell access procedure) of connecting to the base station having transmitted the system information, and search for another cell (or base station). When the terminal has determined that the base station having transmitted the system information to the terminal is a genuine base station, the terminal may continue a procedure of connecting to the base station having transmitted the system information.

When the terminal fails to find a public key in the memory of the USIM or ME, the terminal may proceed to 404.

At 404, the terminal and the base station may perform RRC connection configuration. An initial access process may be performed for a process of RRC connection configuration between the terminal and the base station.

From 401 to 403 of FIG. 4, the terminal may succeed or fail to verify the signature of the base station, and for a resultant additional verification process, some of the stages of FIG. 3 or some of the stages of FIG. 4 may be performed.

At 405, the terminal may transfer a registration request message to an AMF via the base station. The registration request message transmitted by the terminal may include information on a ciphering and integrity protection algorithm supported by the terminal. The registration request message transmitted by the terminal may include at least one in a list of public keys which are currently held by the terminal and are to be used for signature verification. When there is no public key for verifying a value of a signature provided by a base station that the terminal needs to access, the registration request message transmitted by the terminal may include an indicator indicating such information, or at least one in a list of public keys which are currently held by the terminal and are to be used for signature verification. The list of public keys may include, for example, the public keys themselves, or information (e.g., PLMNID+PKID) indicating the public keys. When there is an aggressor base station (e.g., a false base station), the false base station may receive the registration request message transmitted by the terminal, modifies information including the message, and transmit the message to the AMF.

At 406, the terminal and a network (e.g., including base station or core network entities) may perform mutual authentication.

At 407, the AMF may not modify an indicator or a public key list included in the message received from the terminal. The AMF may transmit a NAS security mode command message including the indicator or the public key list received from the terminal. The AMF may identify a ciphering and integrity protection algorithm related to NAS message transmission or reception which is performed with the terminal. The AMF may identify a ciphering and integrity protection algorithm related to NAS message transmission or reception, based on the information on the ciphering and integrity protection algorithm supported by the terminal, the information being received from the terminal. The AMF may generate a ciphering key and an integrity protection key for NAS, based on the identified algorithm and K_amf. The AMF may perform integrity protection of a NAS security mode command message by using the generated integrity protection key for NAS, and transmit the message. The NAS security mode command message may be the first message, among NAS messages, which is subject to integrity protection. The message subjected to integrity protection may not be randomly modifiable by other entities (e.g., aggressor base station) before the terminal receives same. The NAS message may include at least one of the integrity protection algorithm or the ciphering algorithm selected by the AMF. The AMF may identify the received list of public keys and when update of the list of public keys for the terminal is required, may transmit an additional list of public keys. The additional list of public keys transmitted by the AMF may include at least one of a public key for the base station on which the terminal is currently camping, a public key for other base stations in an HPLMN, or a public key for base stations of a VPLMN.

At 408, when a public key(s) is received from the AMF by the terminal, the terminal may store the received public key in an NVM of the USIM or ME. The terminal may compare the indicator or public key list included in the message subjected to integrity protection and received from the AMF, with the indicator or public key list transmitted by the terminal to the AMF in stage 405. When a comparison result indicates that the indicator or public key list transmitted by the terminal is identified to be different from the indicator or public key list received by the terminal, the terminal may identify that there has been a MitM attack during transmission or reception with a core network. When a comparison result indicates that the indicator or public key list transmitted by the terminal is identified to be different from the indicator or public key list received by the terminal, the terminal may identify that there is an aggressor base station (e.g., false base station). When a comparison result indicates that the indicator or public key list transmitted by the terminal is identified to be different from the indicator or public key list received by the terminal, the terminal may search for another cell and make an attempt to attach.

At 409, the terminal may transmit a NAS security mode complete message including a list of public keys for signature verification owned by the terminal to the AMF. The terminal may generate a ciphering key or an integrity protection key for NAS, based on the ciphering algorithm and the integrity protection algorithm received from the AMF at 407. The terminal may perform ciphering and integrity protection of subsequent NAS messages including the NAS security mode complete message, based on the generated keys, and transmit the messages.

At 410, the AMF may transfer the received list of public keys to a UDP together with a SUPI.

At 411, when the UDM having received the list of public keys owned by the terminal identifies that update is needed, based on the received list of public keys, the UDM may perform a process of UPU or SoR to determine whether to update a public key for signature verification for the terminal.

At 412, when it is determined that update of the list of public keys is needed, based on the list of public keys received at 410 (e.g., a new public key for a base station newly deployed in an HPLMN has been added, information on a public key to be used in a network of another service provider has been added due to a new contractual relationship with the other service provider, or a particular public key becomes unnecessary due to revocation of a public key owned by the terminal), the UDM may update the list of public keys for the terminal through a UPU/SoR process. A process of terminal updating through the UPU/SoR process may be performed by at least one of the terminal, the base station, or network entities. A process of updating the list of public keys (e.g., including at least one of a public key of the base station, a public key of other base stations of an HPLMN, or public keys of base stations of VPLMNs) for the terminal may include updating a public key for the terminal by using a UPU process, or updating public key information related to a VPLMN for the terminal by using an SoR process.

At 413, the terminal having received update information for a public key for signature verification through the UPU/SoR process may update public key information in the NVM of the USIM or the ME, based on a public key required for verification of the signature of the base station and an indicator (including a case of a PLMNID+PKID form) indicating the public key, and may store updated contents.

Some of the stages illustrated in FIG. 4 may be performed again, based on the updated public key or public key list of the terminal.

Figure 5:
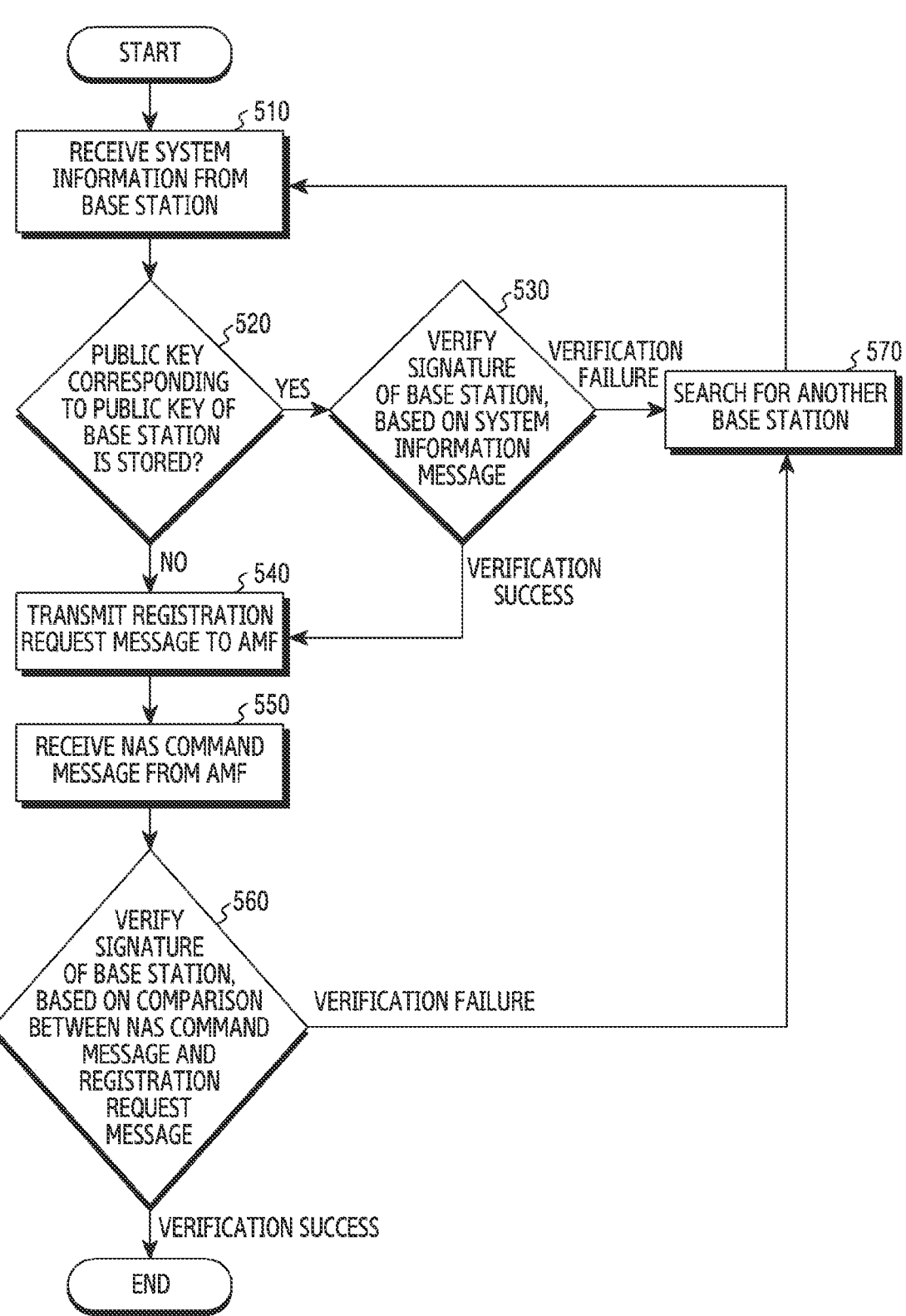
FIG. 5 is a diagram illustrating a detailed operation flow of a terminal to receive a public key for verifying a base station, according to an embodiment.

FIG. 5 is a diagram illustrating a detailed operation flow of a terminal to receive a public key for verifying a base station, according to an embodiment. A terminal may be configured by an ME and a USIM. The ME may include an MT and a TE. The MT may be a part where a wireless access protocol operates, and the TE may be a part where a control function operates. For example, in a wireless communication terminal (e.g., a mobile phone), the MT and the TE may be integrated with each other, and in a notebook, the MT and the TE may be separated from each other. The disclosure may represent the ME and the USIM as entities distinguished from each other according to an operation of each element, but is not limited thereto, and may express a terminal (e.g., a UE) including the ME and the USIM, or express the ME as a terminal to describe various embodiments of the disclosure.

Referring to FIG. 5, at 510, a terminal may receive SI from a base station. Although not illustrated in FIG. 5, the terminal may perform an initial access (e.g., initial attach) operation with the base station. The terminal may receive system information including a signature of the base station, the information being broadcast by the base station. When the SI transmitted by the base station includes a signature, the SI may include an indicator (PK indicator) (e.g., a certificate including a public key of the base station or a public key ID indicating a public key for signature verification) indicating a public key for signature verification. The base station may use, as an additional input, a value of a PCI or a timestamp in order to make a signature. In addition, the SI transmitted by the base station may include at least one of a PLMN ID or cell ID related to the base station.

The terminal having received SI including a PCI from the base station may verify a signature of the base station having transmitted the system information, based on a PCI value of a genuine base station that the terminal needs to access. Alternatively, the terminal may identify, based on received information on a timestamp, whether received SI has been transmitted by a base station required to be accessed or recycled by a false base station.

At 520, the terminal may identify whether a public key corresponding to the public key of the base station is stored.

In a case where the SI includes a signature and a USIM of the terminal supports a function of storing a public key to be used for signature verification, an ME may receive or identify, from or in the USIM, a public key (a corresponding CA certificate in a case of a certificate including the public key of the base station, or a public key matching a corresponding ID in a case of a public key ID indicating a public key for signature verification) corresponding to information on the public key included in the system information.

In a case where the SI includes a signature and the USIM of the terminal does not have a function of storing a public key to be used for signature verification, the ME may identify, in a memory of the ME, a public key corresponding to information on the public key included in the SI.

When it is identified that a public key corresponding to the public key of the base station is stored, the terminal may proceed to 530.

When it is identified that a public key corresponding to the public key of the base station is not stored, the terminal may proceed to 540.

Although not illustrated in FIG. 5, when the SI received by the terminal does not include a signature, the terminal may proceed to stage 540 without an additional operation.

At 530, the terminal may verify the signature of the base station, based on the received SI. The terminal may verify the signature. More specifically, the terminal may verify SI signed based on a private key by the base station, based on a public key of the base station which the terminal is aware of. An asymmetric key method is used, and thus the public key and the private key may be different. The terminal may identify that verification of the base station is completed based on the public key corresponding to the private key used for signing.

When a public key is identified in the memory of the USIM or ME, the terminal may verify the signature included in the SI. When verification is successful, the terminal may proceed to 540. When verification fails, the terminal may identify that there is an aggressor base station (e.g., a false base station). When verification fails, the terminal may proceed to 570. When verification fails, the terminal may search for another cell and make an attempt to attach.

Although not illustrated in FIG. 5, the terminal may perform an initial access process for a process of RRC connection configuration with the base station.

At 540, the terminal may transmit a registration request message to an AMF.

The registration request message transmitted by the terminal may include information on a ciphering and integrity protection algorithm supported by the terminal. The registration request message transmitted by the terminal may include at least one in a list of public keys which are currently held by the terminal and are to be used for signature verification. When there is no public key for verifying a value of a signature provided by a base station that the terminal needs to access, the registration request message transmitted by the terminal may include an indicator indicating such information, or at least one in a list of public keys which are currently held by the terminal and are to be used for signature verification. The list of public keys may include, for example, the public keys themselves, or information (e.g., PLMNID+PKID) indicating the public keys. When there is an aggressor base station (e.g., a false base station), the false base station may receive the registration request message transmitted by the terminal, modifies information including the message, and transmit the message to the AMF.

Although not illustrated in FIG. 5, the terminal may perform a mutual authentication process with a network (e.g., including the base station or core network entities).

At 550, the terminal may receive a NAS security mode command message from the AMF. The terminal may receive, from the AMF, a NAS security mode command message including the indicator or the public key list having been transmitted to the AMF. The AMF may identify a ciphering and integrity protection algorithm related to NAS message transmission or reception which is performed with the terminal. The AMF may identify a ciphering and integrity protection algorithm related to NAS message transmission or reception, based on the information on the ciphering and integrity protection algorithm supported by the terminal, the information being received from the terminal. The AMF may generate a ciphering key or an integrity protection key for NAS, based on the identified algorithm and K_amf. The AMF may perform integrity protection of a NAS security mode command message by using the generated integrity protection key for NAS, and transmit the message. The NAS security mode command message may be the first message, among NAS messages, which is subject to integrity protection. The message subjected to integrity protection may not be randomly modifiable by other entities (e.g., aggressor base station) before the terminal receives same. The NAS message may include at least one of the integrity protection algorithm or the ciphering algorithm selected by the AMF.

The AMF may identify the received list of public keys and when update of the list of public keys for the terminal is required, may transmit an additional list of public keys to the terminal. The additional list of public keys transmitted by the AMF may include at least one of a public key for the base station on which the terminal is currently camping, a public key for other base stations in an HPLMN, or a public key for base stations of a VPLMN.

At 560, the terminal may verify the signature of the base station, based on a comparison between the received NAS security mode command message and the registration request message. The terminal may identify that there is an aggressor base station (e.g., false base station), based on a comparison between the received NAS security mode command message and the registration request message. When a public key(s) is received from the AMF by the terminal, the terminal may store the received public key in an NVM of the USIM or ME.

The terminal may compare the indicator or public key list included in the message subjected to integrity protection and received from the AMF, with the indicator or public key list transmitted by the terminal to the AMF in stage 540. When a comparison result indicates that the indicator or public key list transmitted by the terminal is identified to be different from the indicator or public key list received by the terminal, the terminal may identify that there has been a MitM attack during transmission or reception with a core network. When a comparison result indicates that the indicator or public key list transmitted by the terminal is identified to be different from the indicator or public key list received by the terminal, the terminal may identify that there is an aggressor base station (e.g., false base station). When a comparison result indicates that the indicator or public key list transmitted by the terminal is identified to be different from the indicator or public key list received by the terminal, the terminal may proceed to 570. When a comparison result indicates that the indicator or public key list transmitted by the terminal is identified to be different from the indicator or public key list received by the terminal, the terminal may search for another cell and make an attempt to attach.

Although not illustrated in FIG. 5, the terminal may further perform a series of processes of updating the list of public keys. The terminal may further perform all of operations described below, some of them, or a combination of some operations.

When the information received at 550 is the same as the information transmitted by the terminal at 540, the terminal may notify the AMF that there is no message falsification, by transmitting a NAS security mode complete message. The terminal may generate a ciphering key or an integrity protection key for NAS, based on the ciphering algorithm and the integrity protection algorithm received from the AMF in stage 550. The terminal may perform ciphering and integrity protection of subsequent NAS messages including the NAS security mode complete message, based on the generated keys, and transmit the messages.

Although not illustrated in FIG. 5, the base station may update a public key for the terminal through an AS security mode command message to be subject to integrity protection, by using public key information received from the AMF. The terminal may receive a message including an updated public key from the base station. The message received by the terminal may include at least one of a public key for the base station having received the public key information from the AMF, a public key for other base stations of an HPLMN, or a public key for base stations of VPLMNs.

When a public key(s) is included in an AS security mode command message received by the terminal from the base station, the terminal may store the public key(s) in an NVM of the USIM or the ME, based on whether a USIM storage function is available. An AS security mode command may be the message that is first subjected to integrity protection, among AS messages.

The terminal may transmit an AS security mode command message to the base station. An AS security mode complete message may be the message that is first subjected to ciphering and integrity protection, among AS messages. The message subjected to integrity protection may not be randomly modifiable by other entities (e.g., aggressor base station) before the terminal receives same.

When it is determined that update of the list of public keys is needed, based on the list of public keys received from the AMF (e.g., a new public key for a base station newly deployed in an HPLMN has been added, information on a public key to be used in a network of another service provider has been added due to a new contractual relationship with the other service provider, or a particular public key becomes unnecessary due to revocation of a public key owned by the terminal), a UDM may update the list of public keys for the terminal through a UPU/SoR process. A process of updating the list of public keys (e.g., including at least one of a public key of the base station, a public key of other base stations of an HPLMN, or public keys of base stations of VPLMNs) for the terminal may include updating a public key for the terminal by using a UPU process, or updating public key information related to a VPLMN for the terminal by using an SoR process.

The terminal having received update information for a public key for signature verification through the UPU/SoR process may update public key information in the NVM of the USIM or the ME, based on a public key required for verification of the signature of the base station and an indicator (including a case of a PLMNID+PKID form) indicating the public key, and may store updated contents.

At 570, the terminal may search for another cell and make an attempt to attach.

Some of the stages illustrated in FIG. 5 may be performed again, based on the updated public key or public key list of the terminal.

An operation of the terminal may not be restricted to the operations described with reference to FIG. 5. The terminal may perform all of operations of FIG. 5, some of them, or a combination of some operations. The terminal may perform all of operations of FIGS. 3 to 5, some of them, or a combination of some operations.

Figure 6:
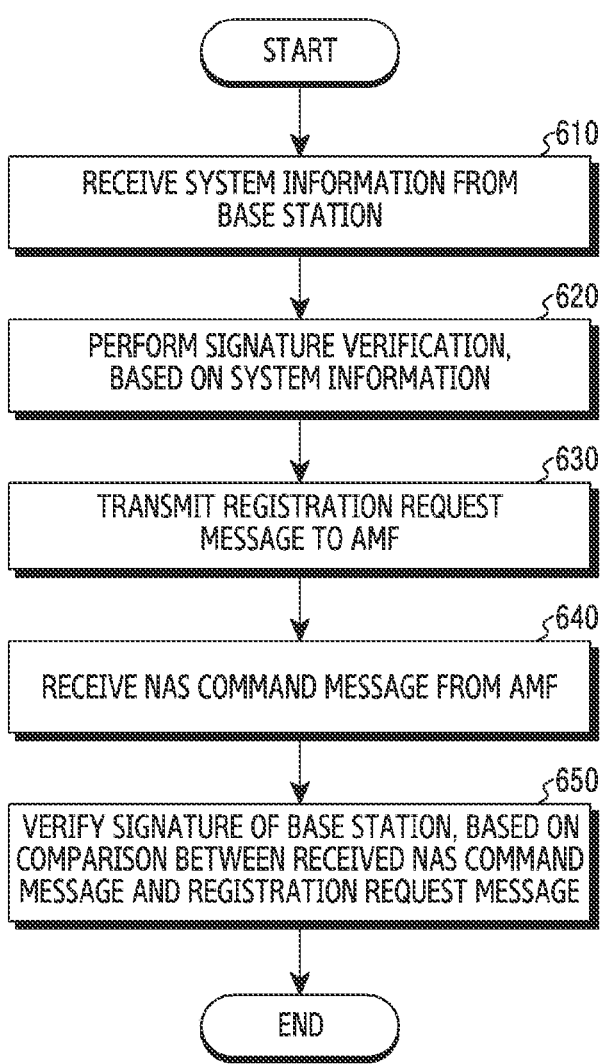
FIG. 6 is a diagram illustrating an operational flow of a terminal to receive a public key for verifying a base station, according to an embodiment.

FIG. 6 is a diagram illustrating an operation flow of a terminal to receive a public key for verifying a base station, according to an embodiment. A terminal may be configured by an ME and a USIM. The ME may include an MT and a TE. The MT may be a part where a wireless access protocol operates, and the TE may be a part where a control function operates. For example, in a wireless communication terminal (e.g., a mobile phone), the MT and the TE may be integrated with each other, and in a notebook, the MT and the TE may be separated from each other. The disclosure may represent the ME and the USIM as entities distinguished from each other according to an operation of each element, but is not limited thereto, and may express a terminal (e.g., UE) including the ME and the USIM, or express the ME as a terminal to describe various embodiments of the disclosure.

Referring to FIG. 6, at 610, a terminal may receive SI from a base station. Although not illustrated in FIG. 6, the terminal may perform an initial access (e.g., initial attach) operation with the base station. The terminal may receive SI including a signature of the base station, the information being broadcast by the base station. When the SI transmitted by the base station includes a signature, the SI may include an indicator (PK indicator) (e.g., a certificate including a public key of the base station or a public key ID indicating a public key for signature verification) indicating a public key for signature verification. The base station may use, as an additional input, a value of a PCI or a timestamp in order to make a signature. In addition, the SI transmitted by the base station may include at least one of a PLMN ID or cell ID related to the base station.

The terminal having received SI including a PCI from the base station may verify a signature of the base station having transmitted the SI, based on a PCI value of a genuine base station that the terminal needs to access. Alternatively, the terminal may identify, based on received information on a timestamp, whether received SI has been transmitted by a base station required to be accessed or recycled by a false base station.

At 620, the terminal may perform signature verification, based on the SI. More specifically, the terminal may perform an operation, based on the received system information.

The terminal may verify the signature. More specifically, the terminal may verify SI signed based on a private key by the base station, based on a public key of the base station which the terminal is aware of. An asymmetric key method is used, and thus the public key and the private key may be different. The terminal may identify that verification of the base station is completed based on the public key corresponding to the private key used for signing.

When the SI received by the terminal does not include a signature, the terminal may proceed to a next stage without an additional operation.

In a case where the SI includes a signature and a USIM of the terminal supports a function of storing a public key to be used for signature verification, an ME may receive or identify, from or in the USIM, a public key (a corresponding CA certificate in a case of a certificate including the public key of the base station, or a public key matching a corresponding ID in a case of a public key ID indicating a public key for signature verification) corresponding to information on the public key included in the SI.

In a case where the SI includes a signature and the USIM of the terminal does not have a function of storing a public key to be used for signature verification, the ME may identify, in a memory of the ME, a public key corresponding to information on the public key included in the system information.

When a public key is identified in the memory of the USIM or ME, the terminal may verify the signature included in the SI. When verification is successful, the terminal may proceed to a next stage. When verification fails, the terminal may identify that there is an aggressor base station (e.g., a false base station). When verification fails, the terminal may search for another cell and make an attempt to attach. When the terminal has determined that the base station having transmitted the SI to the terminal is an aggressor base station, the terminal may stop a procedure (e.g., a cell access procedure) of connecting to the base station having transmitted the SI, and search for another cell (or base station).

When the terminal has determined that the base station having transmitted the SI to the terminal is a genuine base station, the terminal may continue a procedure of connecting to the base station having transmitted the SI.

When the terminal fails to find a public key in the memory of the USIM or ME, the terminal may proceed to a next stage.

Although not illustrated in FIG. 6, the terminal may perform an initial access process for a process of RRC connection configuration with the base station.

At 630, the terminal may transmit a registration request message to an AMF.

The registration request message transmitted by the terminal may include information on a ciphering and integrity protection algorithm supported by the terminal. The registration request message transmitted by the terminal may include at least one in a list of public keys which are currently held by the terminal and are to be used for signature verification. When there is no public key for verifying a value of a signature provided by a base station that the terminal needs to access, the registration request message transmitted by the terminal may include an indicator indicating such information, or at least one in a list of public keys which are currently held by the terminal and are to be used for signature verification. The list of public keys may include, for example, the public keys themselves, or information (e.g., PLMNID+PKID) indicating the public keys. When there is an aggressor base station (e.g., a false base station), the false base station may receive the registration request message transmitted by the terminal, modify information including the message, and transmit the message to the AMF.

Although not illustrated in FIG. 6, the terminal may perform a mutual authentication process with a network (e.g., including the base station or core network entities).

At 640, the terminal may receive a NAS security mode command message from the AMF. The terminal may receive, from the AMF, a NAS) security mode command message including the indicator or the public key list having been transmitted to the AMF. The AMF may identify a ciphering and integrity protection algorithm related to NAS message transmission or reception which is performed with the terminal. The AMF may identify a ciphering and integrity protection algorithm related to NAS message transmission or reception, based on the information on the ciphering and integrity protection algorithm supported by the terminal, the information being received from the terminal. The AMF may generate a ciphering key or an integrity protection key for NAS, based on the identified algorithm and K_amf. The AMF may perform integrity protection of a NAS security mode command message by using the generated integrity protection key for NAS, and transmit the message. The NAS security mode command message may be the first message, among NAS messages, which is subject to integrity protection. The message subjected to integrity protection may not be randomly modifiable by other entities (e.g., aggressor base station) before the terminal receives same. The NAS message may include at least one of the integrity protection algorithm or the ciphering algorithm selected by the AMF.

The AMF may identify the received list of public keys and when update of the list of public keys for the terminal is required, may transmit an additional list of public keys to the terminal. The additional list of public keys transmitted by the AMF may include at least one of a public key for the base station on which the terminal is currently camping, a public key for other base stations in an HPLMN, or a public key for base stations of a VPLMN.

At 650, the terminal may verify the signature of the base station, based on a comparison between the received NAS security mode command message and the registration request message. The terminal may identify that there is an aggressor base station (e.g., false base station), based on a comparison between the received NAS security mode command message and the registration request message. When a public key(s) is received from the AMF by the terminal, the terminal may store the received public key in an NVM of the USIM or ME.

The terminal may compare the indicator or public key list included in the message subjected to integrity protection and received from the AMF, with the indicator or public key list transmitted by the terminal to the AMF at 630. When a comparison result indicates that the indicator or public key list transmitted by the terminal is identified to be different from the indicator or public key list received by the terminal, the terminal may identify that there has been a MitM attack during transmission or reception with a core network. When a comparison result indicates that the indicator or public key list transmitted by the terminal is identified to be different from the indicator or public key list received by the terminal, the terminal may identify that there is an aggressor base station (e.g., false base station). When a comparison result indicates that the indicator or public key list transmitted by the terminal is identified to be different from the indicator or public key list received by the terminal, the terminal may search for another cell and make an attempt to attach.

Although not illustrated in FIG. 6, the terminal may further perform a series of processes of updating the list of public keys. The terminal may further perform all of operations described below, some of them, or a combination of some operations.

When the information received at 640 is the same as the information transmitted by the terminal at 630, the terminal may notify the AMF that there is no message falsification, by transmitting a NAS security mode complete message. The terminal may generate a ciphering key or an integrity protection key for NAS, based on the ciphering algorithm and the integrity protection algorithm received from the AMF at 640. The terminal may perform ciphering and integrity protection of subsequent NAS messages including the NAS security mode complete message, based on the generated keys, and transmit the messages.

The base station may update a public key for the terminal through an AS security mode command message to be subject to integrity protection, by using public key information received from the AMF. The terminal may receive a message including an updated public key from the base station. The message received by the terminal may include at least one of a public key for the base station having received the public key information from the AMF, a public key for other base stations of an HPLMN, or a public key for base stations of VPLMNs.

When a public key(s) is included in an AS security mode command message received by the terminal from the base station, the terminal may store the public key(s) in an NVM of the USIM or the ME, based on whether a USIM storage function is available. An AS security mode command may be the message that is first subjected to integrity protection, among AS messages.

The terminal may transmit an AS security mode command message to the base station. An AS security mode complete message may be the message that is first subjected to ciphering and integrity protection, among AS messages. The message subjected to integrity protection may not be randomly modifiable by other entities (e.g., aggressor base station) before the terminal receives same.

When it is determined that update of the list of public keys is needed, based on the list of public keys received from the AMF (e.g., a new public key for a base station newly deployed in an HPLMN has been added, information on a public key to be used in a network of another service provider has been added due to a new contractual relationship with the other service provider, or a particular public key becomes unnecessary due to revocation of a public key owned by the terminal), a UDM may update the list of public keys for the terminal through a UPU/SoR process. A process of updating the list of public keys (e.g., including at least one of a public key of the base station, a public key of other base stations of an HPLMN, or public keys of base stations of VPLMNs) for the terminal may include updating a public key for the terminal by using a UPU process, or updating public key information related to a VPLMN for the terminal by using an SoR process.

The terminal having received update information for a public key for signature verification through the UPU/SoR process may update public key information in the NVM of the USIM or the ME, based on a public key required for verification of the signature of the base station and an indicator (including a case of a PLMNID+PKID form) indicating the public key, and may store updated contents.

Some of the stages illustrated in FIG. 6 may be performed again, based on the updated public key or public key list of the terminal.

An operation of the terminal may not be restricted to the operations described with reference to FIG. 6. The terminal may perform all of operations of FIG. 6, some of them, or a combination of some operations. The terminal may perform all of operations of FIGS. 3 to 6, some of them, or a combination of some operations.

FIG. 7 is a diagram illustrating an operational flow of an AMF to provision a terminal with a public key for verifying a base station, according to an embodiment.

Referring to FIG. 7, at 710, an AMF may receive a registration request message from a terminal. The AMF may receive the registration request message from the terminal via a base station. The registration request message transmitted by the terminal may include information on a ciphering and integrity protection algorithm supported by the terminal. The registration request message received from the terminal may include at least one in a list of public keys which are currently held by the terminal and are to be used for signature verification. When there is no public key for verifying a value of a signature provided by a base station that the terminal needs to access, the registration request message received from the terminal may include an indicator indicating such information, or at least one in a list of public keys which are currently held by the terminal and are to be used for signature verification. The list of public keys may include, for example, the public keys themselves, or information (e.g., PLMNID+PKID) indicating the public keys. When there is an aggressor base station (e.g., a false base station), the false base station may receive the registration request message transmitted by the terminal, modifies information including the message, and transmit the message to the AMF.

Although not illustrated in FIG. 7, the AMF may perform a mutual authentication process with the terminal or a network (e.g., including the base station or core network entities).

At 720, the AMF may identify a ciphering or integrity protection algorithm, based on the registration request message received from the terminal.

The AMF may identify a ciphering and integrity protection algorithm related to NAS message transmission or reception which is performed with the terminal. The AMF may identify a ciphering and integrity protection algorithm related to NAS message transmission or reception, based on the information on the ciphering and integrity protection algorithm supported by the terminal, the information being received from the terminal. The AMF may generate a ciphering key or an integrity protection key for NAS, based on the identified algorithm and K_amf. The AMF may perform integrity protection of a NAS security mode command message by using the generated integrity protection key for NAS, and transmit the message to the terminal.

At 730, the AMF may transmit a NAS security mode command message to the terminal, based on the identified ciphering or integrity protection algorithm.

The AMF may not modify an indicator or a public key list included in the message received from the terminal. The AMF may transmit, to the terminal, an NAS security mode command message including the indicator or the public key list received from the terminal.

The AMF may perform integrity protection of a NAS security mode command message by using the integrity protection key for NAS which is generated in stage 720, and transmit the message to the terminal. The NAS security mode command message may be the first message, among NAS messages, which is subject to integrity protection. The message subjected to integrity protection may not be randomly modifiable by other entities (e.g., aggressor base station) before the terminal receives same. The NAS message may include at least one of the integrity protection algorithm or the ciphering algorithm selected by the AMF.

The AMF may identify the received list of public keys and when update of the list of public keys for the terminal is required, may transmit an additional list of public keys. The additional list of public keys transmitted by the AMF may include at least one of a public key for the base station on which the terminal is currently camping, a public key for other base stations in an HPLMN, or a public key for base stations of a VPLMN.

At 740, the AMF may receive a NAS security mode complete message.

The AMF may receive, from the terminal, a NAS security mode complete message including a list of public keys for signature verification owned by the terminal.

When the information received from the AMF is the same as the information transmitted by the terminal to the AMF, the terminal may notify the AMF that there is no message falsification, by transmitting a NAS security mode complete message.

The terminal may generate a ciphering key or an integrity protection key for NAS, based on the ciphering algorithm and the integrity protection algorithm received from the AMF. The AMF may receive subsequent NAS messages including the NAS security mode complete message, based on the keys generated by the terminal and based on ciphering and integrity protection.

Although not illustrated in FIG. 7, the AMF may further perform a series of operations related to AS signaling with the terminal. When the AMF receives a NAS security mode complete message from the terminal, the AMF may identify that information received from the terminal has not been falsified. The AMF may identify information of a public key which is to be used for signature verification and is currently owned by the terminal, based on information received from the terminal. When there is information required to be updated among the public keys owned by the terminal, the AMF may transfer the information to the base station. A case where update is needed may include a case where some of the public keys owned by the terminal are revoked, or a public key of a particular PLMN is added/removed due to a new contractual relationship.

At 750, the AMF may transmit a public key list of the terminal to a UDM, based on the NAS security mode complete message received from the terminal. According to an embodiment, the AMF (e.g., the AMF may recognize a public key list currently held by the terminal by combining a public key list received from the terminal and public key list information transferred by the AMF to the base station) that is aware of a public key(s) held by the terminal may transfer, to the UDM, an SUPI that is an identifier indicating the terminal, and a list of public keys held by the terminal.

An operation of the AMF may not be restricted to the operations described with reference to FIG. 7. The terminal may perform all of operations of FIG. 7, some of them, or a combination of some operations. The terminal may perform all of operations of FIGS. 3 to 7, some of them, or a combination of some operations.

There is no intent to limit the scope of embodiments of the disclosure by using a configuration diagram, an illustrative diagram of a control/data signal transmission or reception method, and illustrative diagrams of an operation procedure, which are illustrated in FIG. 1A to FIG. 7. In other words, all the configuration units, entities, or operational stages mentioned with reference to FIG. 1A to FIG. 7 should not be construed as essential elements to practice the disclosure, and the disclosure may be implemented with only some of the elements without departing from the gist of the disclosure.

A method performed by a terminal in a wireless communication system may include receiving system information from a base station. The system information may include information related to a public key of a base station. The method may also include determining whether the public key corresponding to the information related to the public key of the base station is stored in the terminal. In case that the public key is stored, the method may also include verifying a signature of the base station. The method may also include connecting to the base station or searching for another base station, based on whether the signature of the base station is verified.

The method further includes, in case that the system information does not include the signature information of the base station, establishing a radio resource control (RRC) connection with the base station.

The method may further include, in case that the public key is not stored in the terminal, transmitting, to an AMF, a registration request message including information relating to a first list of public keys held by the terminal or an indicator indicating that the public key is not stored in the terminal, and based on the first list of the public keys held by the terminal, receiving, from the AMF, an NAS command message that is subject to ciphering and integrity protection.

The method may further include, comparing information included in the registration request message with information included in the NAS command message, and searching for a cell of a base station other than the base station, based on a result of the comparing.

In the method, the NAS command message may include information on a second list of public keys required to be updated for the terminal.

The method may further include receiving, from the base station, an AS command message including a second list of public keys required to be updated for the terminal, storing the second list of the public keys required to be updated for the terminal, and transmitting an AS complete message to the base station, based on a result of the storing of the second list of the public keys.

The method may further include receiving, from a UDM, information on a list of public keys required to be updated, based on a registration request message and a UE UPU/SoR process.

A method performed by an AMF in a wireless communication system may include receiving, from a terminal, a registration request message including information relating to a first list of public keys held by the terminal or an indicator indicating that a public key of a base station is not stored at the terminal. The method may also include identifying a ciphering and integrity protection algorithm, based on the registration request message, and transmitting an NAS command message to the terminal, based on the registration request message and the identified ciphering and integrity algorithm.

The method may further include transmitting, to the terminal, a second list of public keys required to be updated for the terminal, and receiving, from the terminal, a NAS complete message notifying that there is no falsification of the NAS command message.

The method may further include transmitting a message including information on the first list of public keys held by the terminal to a UDM, based on the NAS complete message, and the message transmitted to the UDM may include information on a SUPI required to identify the terminal.

A terminal in a wireless communication system may include at least one transceiver, and at least one processor functionally coupled to the at least one transceiver. The at least one processor is configured to receive system information from a base station. The system information may include information related to a public key of a base station. The at least one processor is also configured to determine whether the public key corresponding to the information related to the public key is stored in the terminal. In case that the public key is stored in the terminal and the system information includes signature information of the base station, the at least one processor is configured to verify a signature of the base station, and based on a result of the verifying, connect to the base station or search for another base station.

The at least one processor may be further configured to, in case that the system information does not include the signature information of the base station, establish an RRC connection with the base station.

The at least one processor may be further configured to, in case that the public key is not stored in the terminal, transmit, to an AMF, a registration request message including information relating to a first list of public keys held by the terminal or an indicator indicating that the public key is not stored in the terminal, and based on the first list of the public keys held by the terminal, receive, from the AMF, an NAS command message that is subject to ciphering and integrity protection.

The at least one processor may be further configured to compare information included in the registration request message with information included in the NAS command message, and search for a cell of a base station other than the base station, based on a result of the comparing.

The NAS command message may include information on a second list of public keys required to be updated for the terminal.

The at least one processor may be further configured to receive, from the base station, an AS command message including a second list of public keys required to be updated for the terminal, store the second list of the public keys, and transmit an AS complete message to the base station, based on a result of the storing of the second list of the public keys.

The at least one processor may be further configured to receive, from a UDM, information on a list of public keys required to be updated, based on a registration request message and a UE UPU/SoR process.

An AMF in a wireless communication system may include at least one transceiver, and at least one processor functionally coupled to the at least one transceiver. The at least one processor is configured to receive, from a terminal, a registration request message including information relating to a first list of public keys held by the terminal or an indicator indicating that a public key of a base station is not stored at the terminal, identify a ciphering and integrity protection algorithm, based on the registration request message, and transmit an NAS command message to the terminal, based on the registration request message and the identified ciphering and integrity algorithm.

The at least one processor may be further configured to transmit, to the terminal, a second list of public keys required to be updated for the terminal, and receive, from the terminal, a NAS complete message notifying that there is no falsification of the NAS command message.

The at least one processor may be further configured to transmit a message including information on the first list of public keys held by the terminal to a UDM, based on the NAS complete message, and the message transmitted to the UDM may include information on a SUPI required to identify the terminal.

The above-described operations of the embodiments may be implemented by providing any unit of a device with a memory device storing corresponding program codes. That is, a controller in the device may perform the above-described operations by reading and executing the program codes stored in the memory device by means of a processor or CPU.

Various units or modules of an entity or terminal device set forth herein may be operated using hardware circuits such as complementary metal oxide semiconductor-based logic circuits, firmware, or hardware circuits such as combinations of software and/or hardware and firmware and/or software embedded in a machine-readable medium. For example, various electrical structures and methods may be implemented using transistors, logic gates, and electrical circuits such as application-specific integrated circuits.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may al so include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

What is claimed is:

1. A method performed by a user equipment (UE) in a wireless communication system, the method comprising:
receiving, from a base station, first system information including information associated with a first public key of the base station and first signature information of the base station;
identifying whether a second public key corresponding to the information associated with the first public key of the base station is stored in the UE or not;
in case that the second public key is stored in the UE, verifying a signature of the base station based on the second public key and the first signature information of the base station; and
in case that the signature of the base station is verified, establishing a connection with the base station.

2. The method of claim 1, further comprising,
in case that the signature of the base station is not verified, receiving, from another base station, second system information associated with a third public key of the another base station and second signature information of the another base station, and
in case that the second public key is not stored in the UE, establishing a radio resource control (RRC) connection with the base station.

3. The method of claim 1, further comprising, in case that the second public key is not stored in the UE:
transmitting, to an access and mobility management function (AMF) node, a registration request message including information associated with a first list of public keys stored in the UE or an indicator indicating that the second public key is not stored in the UE; and
based on the first list of the public keys stored in the UE, receiving, from the AMF node, a non-access stratum (NAS) command message for a ciphering and integrity protection.

4. The method of claim 3, further comprising:
comparing information included in the registration request message with information included in the NAS command message; and
searching for a cell of another base station different from the base station, based on a result of the comparing.

5. The method of claim 3, wherein the NAS command message includes information on a second list of public keys required to be updated for the UE.

6. The method of claim 3, further comprising:
receiving, from the base station, an access stratum (AS) command message including a second list of public keys required to be updated for the UE;
storing the second list of the public keys; and
transmitting, to the base station, an AS complete message based on a result of the storing of the second list of the public keys.

7. The method of claim 3 further comprising:
receiving, from a unified data manager (UDM) node, information on a second list of public keys required to be updated, based on the registration request message and a UE parameters update (UPU)/steering of roaming (SoR) process.

8. A method performed by an access and mobility management function (AMF) node in a wireless communication system, the method comprising:
receiving, from a user equipment (UE), a registration request message including information associated with a first list of public keys stored in the UE or an indicator indicating that a public key of a base station is not stored in the UE;
identifying a ciphering and integrity protection algorithm, based on the registration request message; and
transmitting, to the UE, a non-access stratum (NAS) command message based on the registration request message and the identified ciphering and integrity protection algorithm.

9. The method of claim 8, further comprising:
transmitting, to the UE, a second list of public keys required to be updated for the UE; and
receiving, from the UE, a NAS complete message notifying that there is no falsification of the NAS command message.

10. The method of claim 9, further comprising:
transmitting, to a unified data manager (UDM), a message including information on the first list of public keys stored in the UE based on the NAS complete message,
wherein the message transmitted to the UDM node comprises information on a subscription permanent identifier (SUPI) required to identify the UE.

11. A user equipment (UE) in a wireless communication system, the UE comprising:
a transceiver; and
a controller coupled with the transceiver,
wherein the controller is configured to:
receive, from a base station, first system information including information associated with a first public key of the base station and first signature information of the base station, identify whether a second public key corresponding to the information associated with the first public key of the base station is stored in the UE or not, in case that the second public key is stored in the UE, verify a signature of the base station based on the second public key and the first signature information of the base station, and in case that the signature of the base station is verified, establish a connection with the base station.

12. The UE of claim 11, wherein the controller is further configured to:

in case that the signature of the base station is not verified, receive, from another base station, second system information associated with a third public key of the another base station and second signature information of the another base station, and in case that the second public key is not stored in the UE, establish a radio resource control (RRC) connection with the base station.

13. The UE of claim 11, wherein the controller is further configured to, in case that the second public key is not stored in the UE:

transmit, to an access and mobility management function (AMF) node, a registration request message including information associated with a first list of public keys stored in the UE or an indicator indicating that the second public key is not stored in the UE, and based on the first list of the public keys stored in the UE, receive, from the AMF node, a non-access stratum (NAS) command message for a ciphering and integrity protection.

14. The UE of claim 13, wherein the controller is further configured to:

compare information included in the registration request message with information included in the NAS command message; and search for a cell of another base station different from the base station, based on a result of the comparing.

15. The UE of claim 13, wherein the NAS command message includes information on a second list of public keys required to be updated for the UE.

16. The UE of claim 13, wherein the controller is further configured to:

receive, from the base station, an access stratum (AS) command message including a second list of public keys required to be updated for the UE, store the second list of the public keys, and transmit, to the base station, an AS complete message based on a result of the storing of the second list of the public keys.

17. The UE of claim 13, wherein the controller is further configured to:

receive, from a unified data manager (UDM) node, information on a second list of public keys required to be updated, based on the registration request message and a UE parameters update (UPU)/steering of roaming (SoR) process.

18. An access and mobility management function (AMF) node in a wireless communication system, the AMF node comprising:

a transceiver; and a controller coupled with the transceiver, wherein the controller is configured to:

receive, from a user equipment (UE), a registration request message including information associated with a first list of public keys stored in the UE or an indicator indicating that a public key of a base station is not stored in the UE, identify a ciphering and integrity protection algorithm, based on the registration request message, and transmit, to the UE, a non-access stratum (NAS) command message based on the registration request message and the identified ciphering and integrity algorithm.

19. The AMF node of claim 18, wherein the controller is further configured to:

transmit, to the UE, a second list of public keys required to be updated for the UE, and receive, from the UE, a NAS complete message notifying that there is no falsification of the NAS command message.

20. The AMF node of claim 19, wherein the controller is further configured to:

transmit, terminal to a unified data manager (UDM) node, a message including information on the first list of public keys stored in the UE based on the NAS complete message, and wherein the message transmitted to the UDM node comprises information on a subscription permanent identifier (SUPI) required to identify the UE.

* * * * *